(12) United States Patent
Jin et al.

(10) Patent No.: US 10,867,409 B2
(45) Date of Patent: Dec. 15, 2020

(54) METHODS AND SYSTEMS TO COMPENSATE FOR VEHICLE CALIBRATION ERRORS

(71) Applicant: Great Wall Motor Company Limited, Baoding (CN)

(72) Inventors: Jingfu Jin, Novi, MI (US); Samir Al-Stouhi, Dearborn, MI (US); Hamid Hekmatian, Farmington, MI (US)

(73) Assignee: Great Wall Motor Company Limited, Baoding (CN)

( * ) Notice: Subject to any disclaimer, the term of this patent is extended or adjusted under 35 U.S.C. 154(b) by 135 days.

(21) Appl. No.: 16/390,281

(22) Filed: Apr. 22, 2019

(65) Prior Publication Data

US 2020/0334861 A1 Oct. 22, 2020

(51) Int. Cl.
*G06K 9/00* (2006.01)
*G06T 7/80* (2017.01)
(Continued)

(52) U.S. Cl.
CPC ........... *G06T 7/85* (2017.01); *B60W 50/0205* (2013.01); *G06T 7/74* (2017.01);
(Continued)

(58) Field of Classification Search
CPC . G06T 2207/30244; G06T 2207/30252; G06T 7/85; G06T 7/74; B60W 50/0205; B60W 2050/0215
See application file for complete search history.

(56) References Cited

U.S. PATENT DOCUMENTS

| 2015/0181198 A1* | 6/2015 | Baele | H04N 13/246 |
| | | | 348/46 |
| 2016/0012643 A1* | 1/2016 | Kezele | G02B 27/0093 |
| | | | 345/633 |

(Continued)

OTHER PUBLICATIONS

Yupeng et al, ("Compensation Method of Binocular Vision Image With UUV Roll and Pitch", Proceedings of 2015 IEEE) (Year: 2015 ).*

(Continued)

*Primary Examiner* — Amara Abdi
(74) *Attorney, Agent, or Firm* — Young Basile Hanlon & MacFarlane, P.C.

(57) ABSTRACT

Methods and system for compensating for vehicle system errors. A virtual camera is added to vehicle sensor configurations and a coordinate transformation process which attempts to match multiple 3D points associated with a landmark to a detected landmark. The virtual camera is associated with the detected landmark. The 3D world coordinate points may be transformed to a real 3D camera coordinate system and then to a virtual 3D camera coordinate system. The 3D points in real and virtual camera coordinate frames are projected onto the corresponding 2D image pixel coordinates, respectively. Inclusion of the virtual camera in the coordinate transformation process presents a 3D to 2D point corresponding problem which may be resolved using camera pose estimation algorithms. An offset compensation transformation matrix may be determined which accounts for errors contributed by mis-calibrated vehicle sensors or systems and applied to all data prior to use by the vehicle control systems.

20 Claims, 15 Drawing Sheets

(51) Int. Cl.
*G06T 7/73* (2017.01)
*B60W 50/02* (2012.01)
(52) U.S. Cl.
CPC .............. *B60W 2050/0215* (2013.01); *G06T 2207/30244* (2013.01); *G06T 2207/30252* (2013.01)

(56) References Cited

U.S. PATENT DOCUMENTS

2016/0224856 A1* 8/2016 Park .................. G06K 9/46
2017/0195564 A1* 7/2017 Appia .................. H04N 9/045
2019/0041513 A1* 2/2019 Chen .................. B60R 11/04
2019/0122386 A1* 4/2019 Wheeler .............. G01S 7/4817

OTHER PUBLICATIONS

Jianhua et al, (Calibration of stereo vision system used on autonomous surface vehicle, 2014 IEEE) (Year: 2014).*

* cited by examiner

METHODS AND SYSTEMS TO COMPENSATE FOR VEHICLE CALIBRATION ERRORS

TECHNICAL FIELD

This disclosure relates to autonomous vehicles. More specifically, this disclosure relates to methods for correcting or compensating for vehicle calibration errors resulting from vehicle sensor calibration, localization, and High/Middle Definition (HD/MD) Map labels, for example.

BACKGROUND

Vehicles may use a variety of sensors such as, but not limited to, High/Middle Definition (HD/MD) Maps, 3D light detection and ranging (LiDAR), cameras, global positioning system (GPS), inertial measurement unit (IMU), radar, and the like, for a variety of functions such as, but not limited to, landmark detection, collision avoidance, parking, navigation, and guidance. This is especially true for autonomous vehicles where precise vehicle sensor extrinsic parameters calibration is crucial for achieving autonomous driving.

For example, landmarks such as, but not limited to, traffic light, lane marks, stop signs, crosswalks, and the like, are generally represented by a unique identifier (ID) and multiple 3D points (e.g., four 3D points define a boundary for a traffic light) in a HD/MD Map, each of which is described with respect to a world frame of reference or world coordinate system. The 3D world frame reference points can be obtained by querying the HD/MD Map with the vehicle's location. The 3D world frame reference points are then projected to 2D image pixel coordinates or image space accordingly. In an ideal scenario, the projected positions in the 2D image should be aligned with the detected boundaries of the actual landmarks. However, the projected positions, which are affected by vehicle sensor calibration, localization, and the HD/MD-Map label, are not completely reliable. Consequently, the projected positions may have a large offset with respect to the actual landmark positions.

SUMMARY

Disclosed herein are methods and systems to compensate for vehicle calibration errors to enhance object detection accuracy. Methods and system for compensating for vehicle system errors. A virtual camera is added to vehicle sensor configurations and a coordinate transformation process which attempts to match multiple 3D points associated with a landmark to an actual or detected landmark. The virtual camera is associated with the detected landmark. The 3D world coordinate points may be transformed to a real 3D camera coordinate system and from the real 3D camera coordinate system to a virtual 3D camera coordinate system. Then, the 3D points in real camera and virtual camera coordinate frames are projected onto the corresponding 2D image pixel coordinates or image spaces, respectively. Inclusion of the virtual camera in the coordinate transformation process presents a 3D to 2D point corresponding problem which may be resolved using camera pose estimation algorithms. An offset compensation transformation matrix may then be determined which accounts for errors contributed by mis-calibrated vehicle sensors or systems. The offset compensation transformation matrix may then be applied to all data prior to use by the vehicle control systems.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
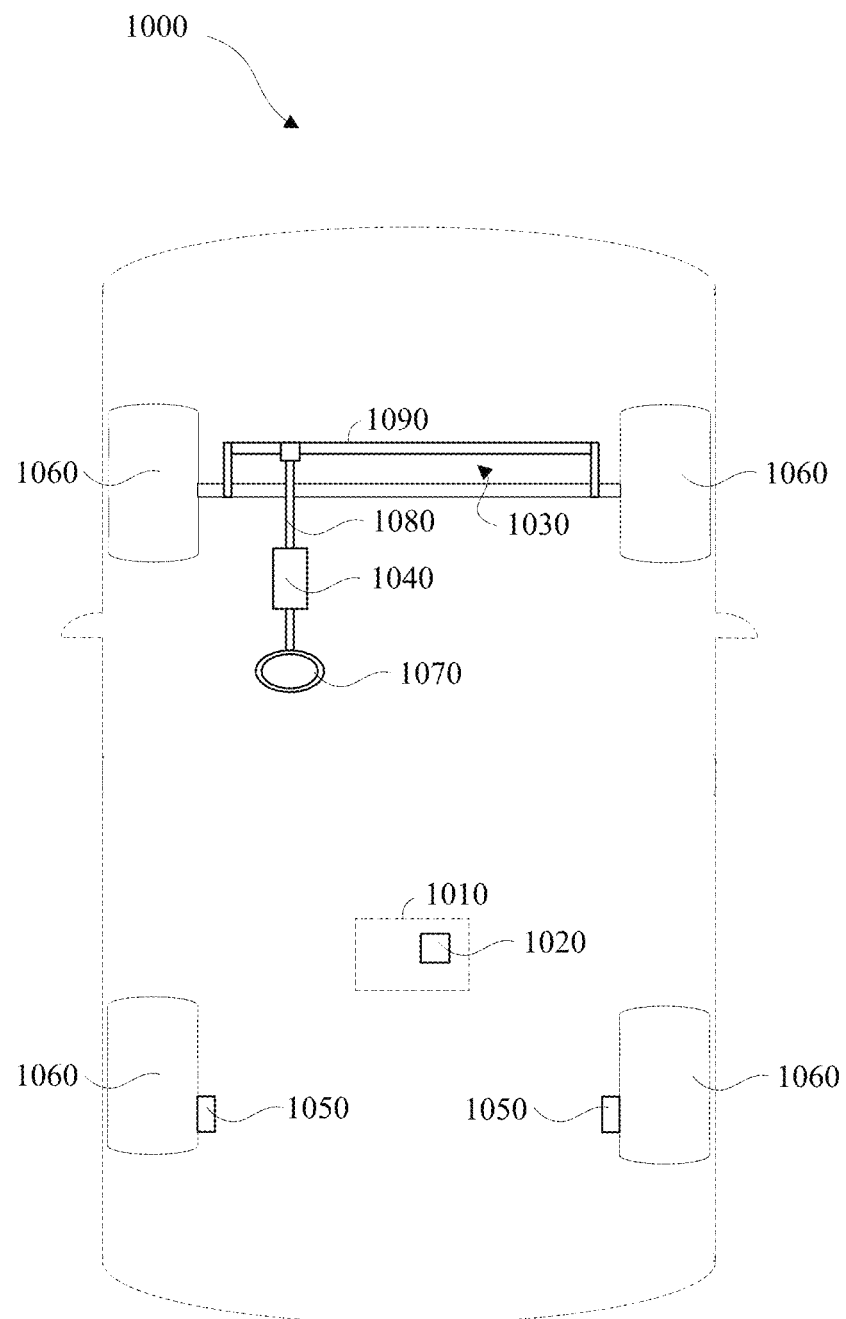
FIG. 1 is a diagram of an example of a vehicle in accordance with embodiments of this disclosure.

Reference will now be made in greater detail to a preferred embodiment of the invention, an example of which is illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Figure 14:
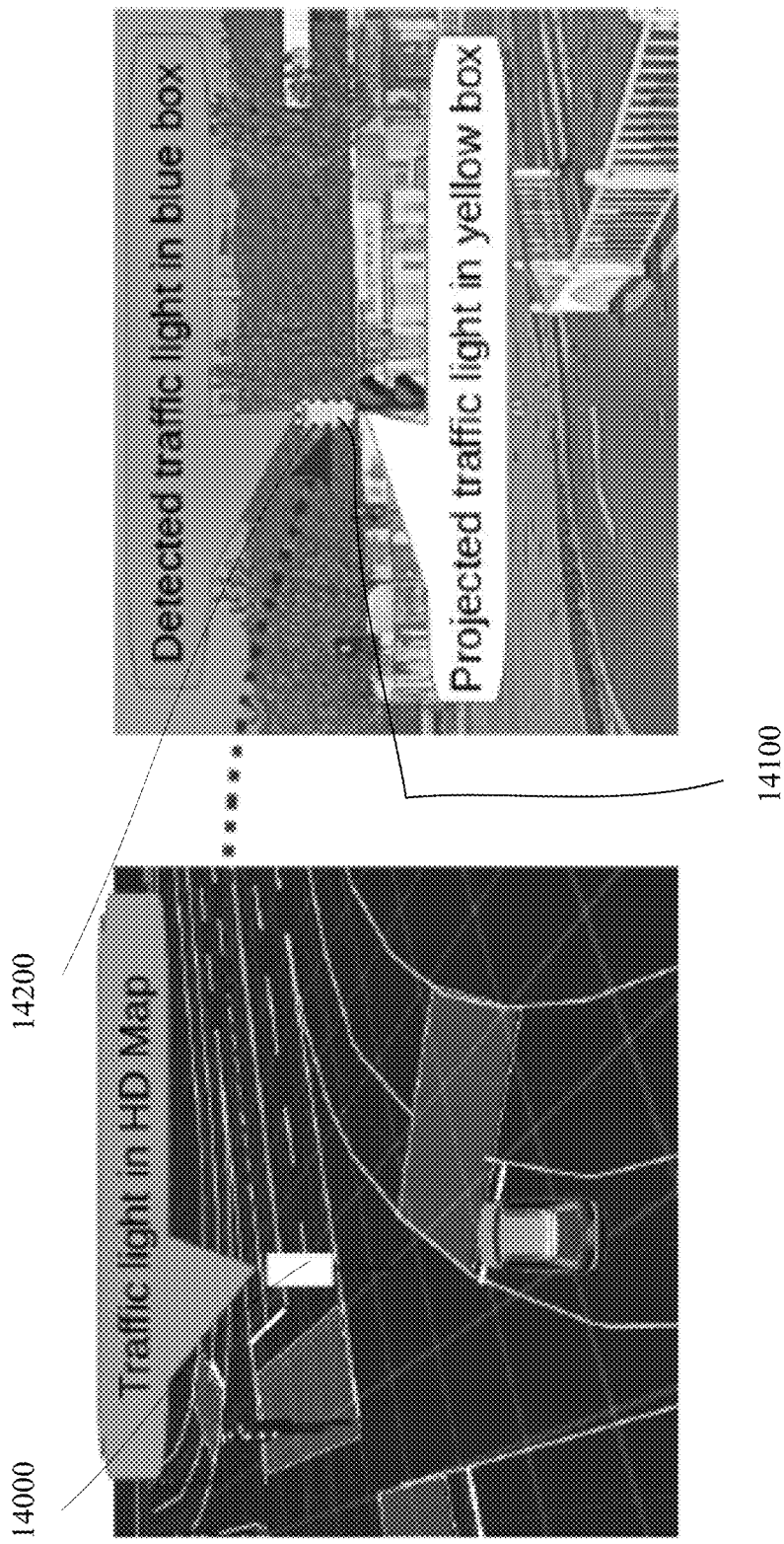
FIG. 14 is a photograph of an example landmark mismatch.

Precise vehicle sensor extrinsic parameters calibration is crucial for achieving autonomous driving in urban environments and the like. Vehicle sensors and systems that may be subject to correction or calibration may include High/Middle Definition (HD/MD) Maps, 3D light detection and ranging (LiDAR), cameras, global positioning system (GPS), inertial measurement unit (IMUs), radar, and the like. In an example, FIG. 14 shows a photograph of an example landmark match with a calibrated system. An example landmark is shown as traffic light 14000. The 3D points are described with respect to a world coordinate system and are obtained by querying the HD/MD Map with the vehicle's location. The 3D points are then projected to a 2D image pixel coordinate system and is shown as projected traffic light 14100. In a calibrated system, the projected traffic light 14100 is aligned with the boundaries of a detected traffic light 14200 in the same image pixel coordinate system.

Figure 15:
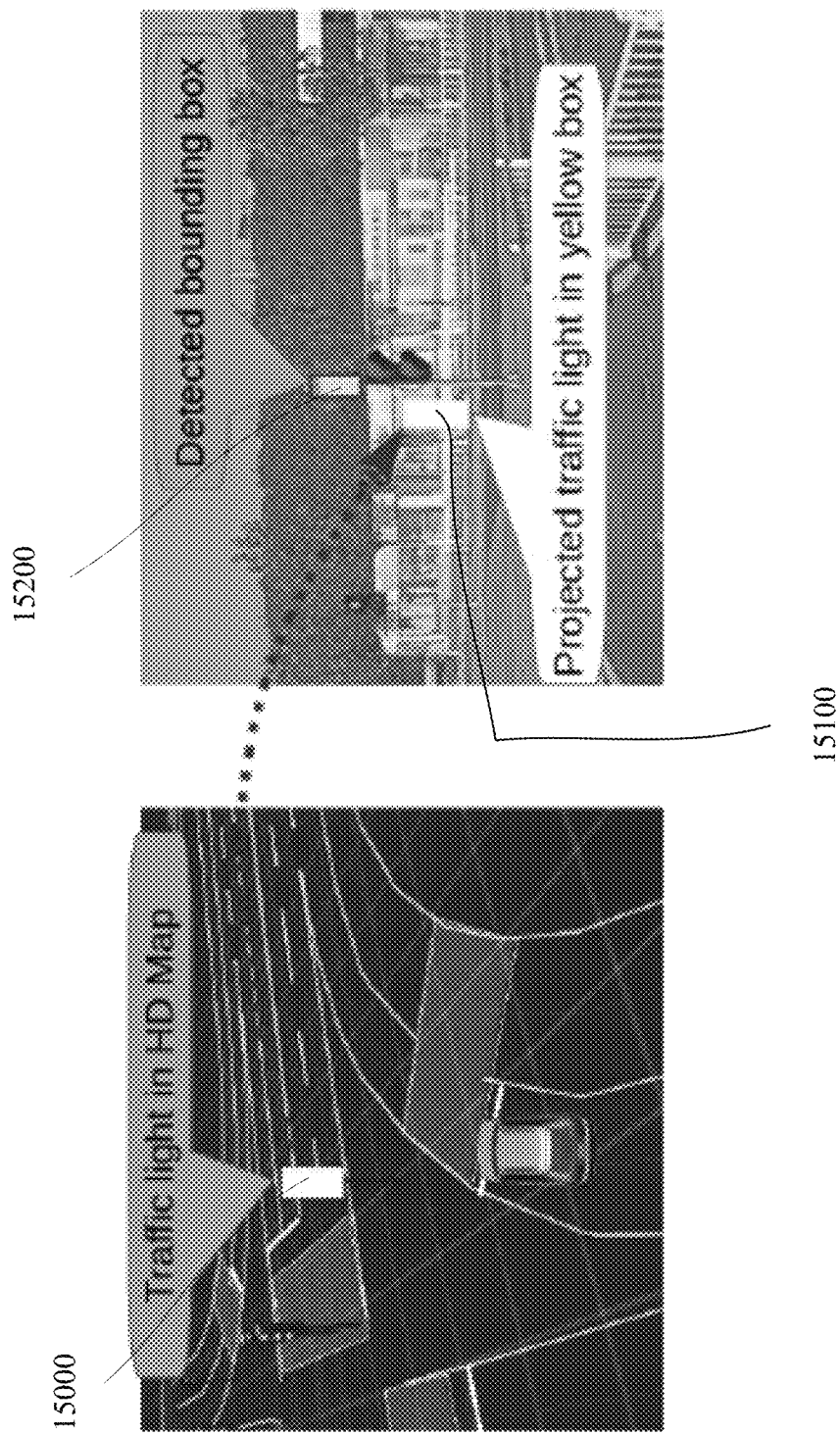
FIG. 15 is a photograph of an example landmark match.

In another example, FIG. 15 shows a photograph of an example landmark mismatch with mis-calibrated systems (inaccurate systems). As discussed above, a traffic light 15000 may be queried from the HD/MD Map and then projected into the 2D image pixel coordinate system. This is shown as projected traffic light 15100. In a mis-calibrated system, the projected traffic light 15100 is not aligned with the boundaries of a detected traffic light 15200 in the same image pixel coordinate system or image space. This happens because the vehicle sensor calibration, localization, and the HD/MD-Map labels are not reliable. Consequently, the projected traffic light 15100 has a large offset with respect to the detected traffic light 15200.

Described herein is a method to compensate for vehicle calibration errors which may result from various vehicle sensors and systems such as, but not limited to, vehicle sensor calibration, localization, and HD/MD Map. That is, the projected positions which are affected by calibration errors can be compensated for by using the methods described herein. The techniques described herein compensate for vehicle sensor calibration, localization, HD Map label and other vehicle systems and sensors errors so that the projected landmark (e.g., the traffic light in FIGS. 14 and 15) positions and actual detected landmark positions have better or near alignment with each other.

In an implementation, a virtual camera is added to the vehicle sensor configurations and to the coordinate transformation process. The virtual camera is associated with an actual or detected static landmark or a dynamic object. For example, 3D points for a landmark may be queried from a HD/MD map. These 3D points may be in a world coordinate system. The 3D world coordinate points may be transformed (and eventually projected) to an IMU frame, from the IMU frame to a LiDAR frame, from the LiDAR frame to a real 3D camera coordinate system, and from the real 3D camera coordinate system to a virtual 3D camera coordinate system, where the latter transformation is an offset or error compensation transformation which accounts for errors contributed by mis-calibrated vehicle sensors or systems. Then, the 3D points in real camera and virtual camera coordinate frames are projected onto the corresponding 2D image pixel coordinates or image spaces, respectively. Inclusion of the virtual camera in the coordinate transformation process may be presented or treated as a 3D to 2D point corresponding problem which may be resolved using camera pose estimation algorithms. The offset compensation transformation may then be applied to all data prior to use by the vehicle systems. In an implementation, the error compensation transformation may be calculated once, periodically, based on projection-detected error difference (threshold based), or a combination thereof. In an implementation, how many times the error compensation transformation is determined may depend on the source of the error or the cause of the offset between the projected and the actual or detected landmark of object.

FIG. 1 is a diagram of an example of a vehicle 1000 in accordance with embodiments of this disclosure. The vehicle 1000 may be an autonomous vehicle (AV) or a semi-autonomous vehicle. As shown in FIG. 1, the vehicle 1000 includes a control system 1010. The control system 1010 may be referred to as a controller. The control system 1010 includes a processor 1020. The processor 1020 is programmed to command application of one of up to a predetermined steering torque value and up to a predetermined net asymmetric braking force value. Each predetermined force is selected to achieve a predetermined vehicle yaw torque that is at most the lesser of a first maximum yaw torque resulting from actuating a steering system 1030 and a second maximum yaw torque resulting from actuating a brake system.

The steering system 1030 may include a steering actuator 1040 that is an electric power-assisted steering actuator. The brake system may include one or more brakes 1050 coupled to respective wheels 1060 of the vehicle 1000. Additionally, the processor 1020 may be programmed to command the brake system to apply a net asymmetric braking force by each brake 1050 applying a different braking force than the other brakes 1050.

The processor 1020 may be further programmed to command the brake system to apply a braking force, for example, a net asymmetric braking force, in response to a failure of the steering system 1030. Additionally or alternatively, the processor 1020 may be programmed to provide a warning to an occupant in response to the failure of the steering system 1030. The steering system 1030 may be a power-steering control module. The control system 1010 may include the steering system 1030. Additionally, the control system 1010 may include the brake system.

The steering system 1030 may include a steering actuator 1040 that is an electric power-assisted steering actuator. The brake system may include two brakes 1050 coupled to respective wheels 1060 on opposite sides of the vehicle 1000. Additionally, the method may include commanding the brake system to apply a net asymmetric braking force by each brake 1050 applying a different braking force.

The control system 1010 allows one of the steering system 1030 and the brake system to take over for the other of the steering system 1030 and the brake system if the other fails while the vehicle 1000 is executing a turn. Whichever of the steering system 1030 and the braking system remains operable is then able to apply sufficient yaw torque to the vehicle 1000 to continue the turn. The vehicle 1000 is, therefore, less likely to impact an object such as another vehicle or a roadway barrier, and any occupants of the vehicle 1000 are less likely to be injured.

The vehicle 1000 may operate in one or more of the levels of autonomous vehicle operation. For purposes of this disclosure, an autonomous mode is defined as one in which each of propulsion (e.g., via a powertrain including an electric motor and/or an internal combustion engine), braking, and steering of the vehicle 1000 are controlled by the processor 1020; in a semi-autonomous mode the processor 1020 controls one or two of the propulsion, braking, and steering of the vehicle 1000. Thus, in one example, non-autonomous modes of operation may refer to SAE levels 0-1, partially autonomous or semi-autonomous modes of operation may refer to SAE levels 2-3, and fully autonomous modes of operation may refer to SAE levels 4-5.

Figure 2:
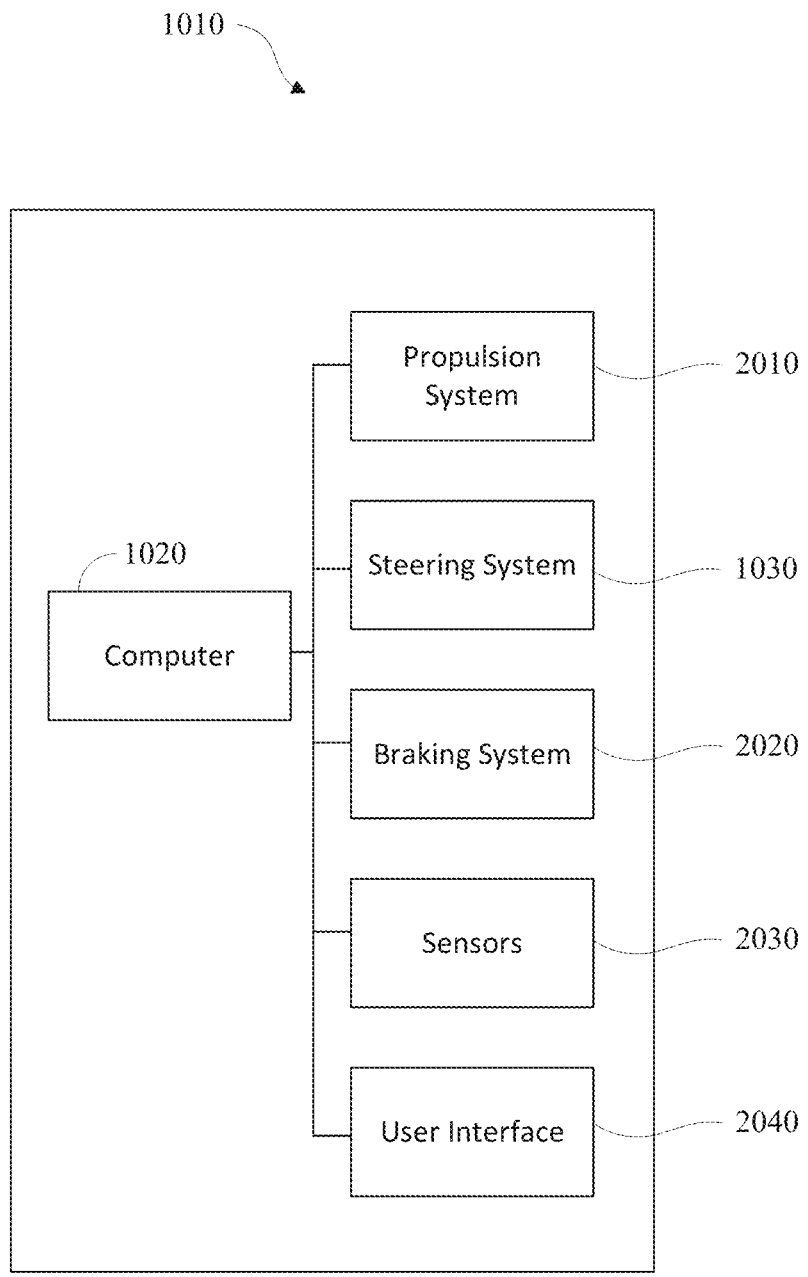
FIG. 2 is a diagram of an example of the control system shown in FIG. 1.

With reference to FIG. 2, the control system 1010 includes the processor 1020. The processor 1020 is included in the vehicle 1000 for carrying out various operations, including as described herein. The processor 1020 is a computing device that generally includes a processor and a memory, the memory including one or more forms of computer-readable media, and storing instructions executable by the processor for performing various operations, including as disclosed herein. The memory of the processor 1020 further generally stores remote data received via various communications mechanisms; e.g., the processor 1020 is generally configured for communications on a communications network within the vehicle 1000. The processor 1020 may also have a connection to an onboard diagnostics connector (OBD-II). Although one processor 1020 is shown in FIG. 2 for ease of illustration, it is to be understood that the processor 1020 could include, and various operations described herein could be carried out by one or more computing devices. The processor 1020 may be a control module, for example, a power-steering control module, or may include a control module among other computing devices.

The control system 1010 may transmit signals through the communications network, which may be a controller area network (CAN) bus, Ethernet, Local Interconnect Network (LIN), Bluetooth, and/or by any other wired or wireless communications network. The processor 1020 may be in communication with a propulsion system 2010, the steering system 1030, the brake system 2020, sensors 2030, and/or a user interface 2040, among other components.

With continued reference to FIG. 2, the propulsion system 2010 of the vehicle 1000 generates energy and translates the energy into motion of the vehicle 1000. The propulsion system 2010 may be a known vehicle propulsion subsystem, for example, a conventional powertrain including an internal-combustion engine coupled to a transmission that transfers rotational motion to road wheels 1060; an electric powertrain including batteries, an electric motor, and a transmission that transfers rotational motion to the road wheels 1060; a hybrid powertrain including elements of the conventional powertrain and the electric powertrain; or any other type of propulsion. The propulsion system 2010 is in communication with and receives input from the processor 1020 and from a human driver. The human driver may control the propulsion system 2010 via, e.g., an accelerator pedal and/or a gear-shift lever (not shown).

With reference to FIGS. 1 and 2, the steering system 1030 is typically a known vehicle steering subsystem and controls the turning of the road wheels 1060. The steering system 1030 is in communication with and receives input from a steering wheel 1070 and the processor 1020. The steering system 1030 may be a rack-and-pinion system with electric power-assisted steering via a steering actuator 1040, a steer-by-wire system, as are both known in the art, or any other suitable system. The steering system 1030 may include the steering wheel 1070 fixed to a steering column 1080 coupled to a steering rack 1090.

With reference to FIG. 1, the steering rack 1090 is turnably coupled to the road wheels 1060, for example, in a four-bar linkage. Translational motion of the steering rack 1090 results in turning off the road wheels 1060. The steering column 1080 may be coupled to the steering rack 1090 via a rack-and-pinion, that is, gear meshing between the pinion gear and rack gear (not shown).

The steering column 1080 transfers rotation of the steering wheel 1070 to movement of the steering rack 1090. The steering column 1080 may be, e.g., a shaft connecting the steering wheel 1070 to the steering rack 1090. The steering column 1080 may house a torsion sensor and a clutch (not shown).

The steering wheel 1070 allows an operator to steer the vehicle 1000 by transmitting rotation of the steering wheel 1070 to movement of the steering rack 1090. The steering wheel 1070 may be, e.g., a rigid ring fixedly attached to the steering column 1080 such as is known.

With continued reference to FIG. 1, the steering actuator 1040 is coupled to the steering system 1030, e.g., the steering column 1080, so as to cause turning of the road wheels 1060. For example, the steering actuator 1040 may be an electric motor rotatably coupled to the steering column 1080, that is, coupled so as to be able to apply a steering torque to the steering column 1080. The steering actuator 1040 may be in communication with the processor 1020.

The steering actuator 1040 may provide power assist to the steering system 1030. In other words, the steering actuator 1040 may provide torque in a direction in which the steering wheel 1070 is being rotated by a human driver, allowing the driver to turn the steering wheel 1070 with less effort. The steering actuator 1040 may be an electric power-assisted steering actuator.

With reference to FIGS. 1 and 2, the brake system 2020 is typically a known vehicle braking subsystem and resists the motion of the vehicle 1000 to thereby slow and/or stop the vehicle 1000. The brake system 2020 includes brakes 1050 coupled to the road wheels 1060. The brakes 1050 may be friction brakes such as disc brakes, drum brakes, band brakes, and so on; regenerative brakes; any other suitable type of brakes; or a combination. The brakes 1050 may be coupled to, e.g., respective road wheels 1060 on opposite sides of the vehicle 1000. The brake system 2020 is in communication with and receives input from the processor 1020 and a human driver. The human driver may control the braking via, e.g., a brake pedal (not shown).

With reference to FIG. 2, the vehicle 1000 may include the sensors 2030. The sensors 2030 may detect internal states of the vehicle 1000, for example, wheel speed, wheel orientation, and engine and transmission variables. The sensors 2030 may detect the position or orientation of the vehicle 1000, for example, global positioning system (GPS) sensors; accelerometers such as piezo-electric or microelectromechanical systems (MEMS); gyroscopes such as rate, a ring laser, or fiber-optic gyroscopes; inertial measurements units (IMU); and magnetometers. The sensors 2030 may detect the external world, for example, radar sensors, scanning laser rangefinders, light detection and ranging (LIDAR) devices, and image processing sensors such as cameras. The sensors 2030 may include communications devices, for example, vehicle-to-infrastructure (V2I) devices, vehicle-to-vehicle (V2V) devices, or vehicle-to-everything (V2E) devices.

The user interface 2040 presents information to and receives information from an occupant of the vehicle 1000. The user interface 2040 may be located, e.g., on an instrument panel in a passenger cabin (not shown) of the vehicle 1000, or wherever may be readily seen by the occupant. The user interface 2040 may include dials, digital readouts, screens, speakers, and so on for output, i.e., providing information to the occupant, e.g., a human-machine interface (HMI) including elements such as are known. The user interface 2040 may include buttons, knobs, keypads, touchscreens, microphones, and so on for receiving input, i.e., information, instructions, etc., from the occupant.

Figure 3:
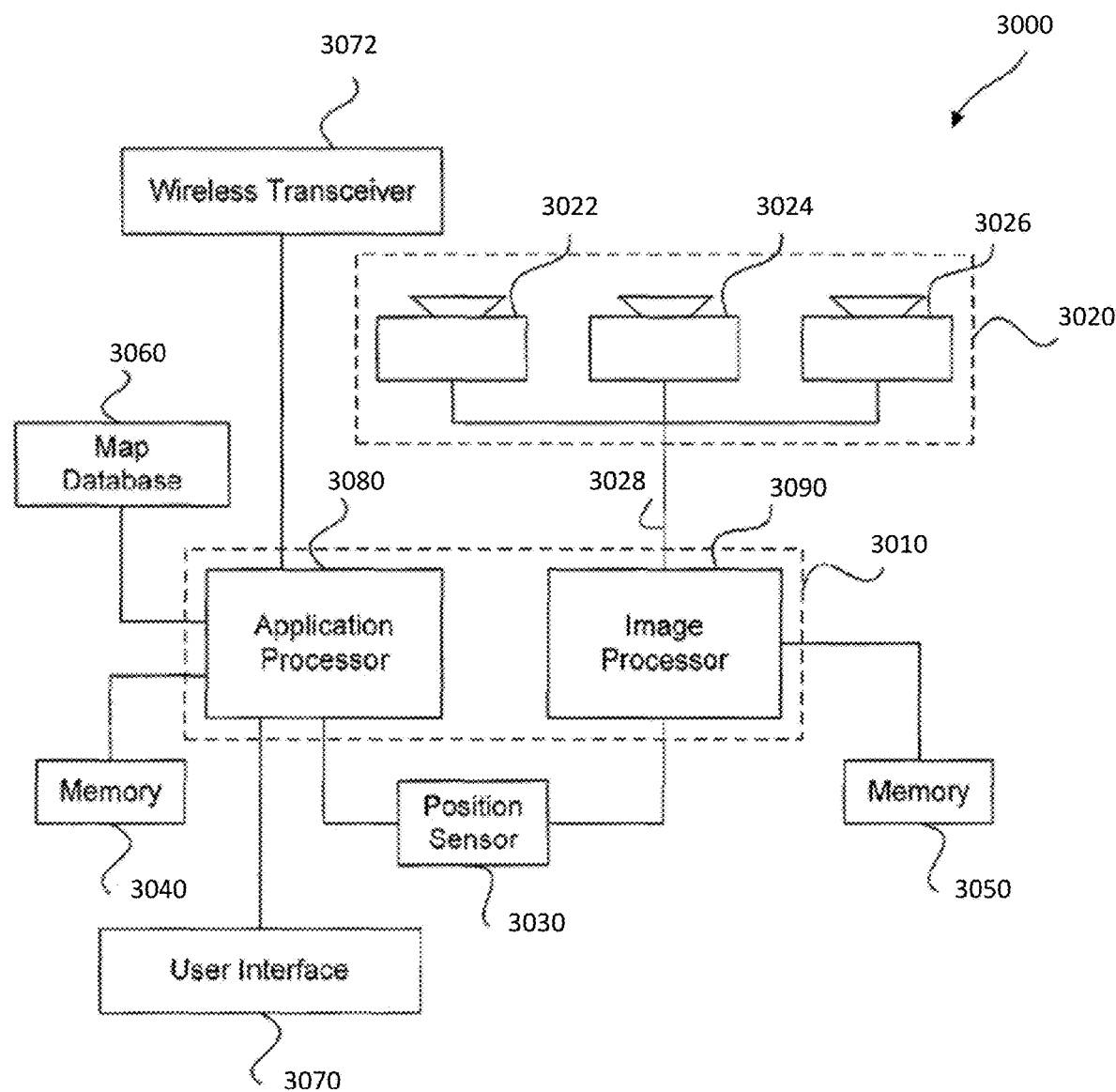
FIG. 3 is a diagram of an example of a vehicle control system in accordance with embodiments of this disclosure.

FIG. 3 is a diagram of an example of a vehicle control system 3000 in accordance with embodiments of this disclosure. Vehicle control system 3000 may include various components depending on the requirements of a particular implementation. In some embodiments, vehicle control system 3000 may include a processing unit 3010, an image acquisition unit 3020, a position sensor 3030, one or more memory units 3040, 3050, a map database 3060, a user interface 3070, and a wireless transceiver 3072. Processing unit 3010 may include one or more processing devices. In some embodiments, processing unit 3010 may include an applications processor 3080, an image processor 3090, or any other suitable processing device. Similarly, image acquisition unit 3020 may include any number of image acquisition devices and components depending on the requirements of a particular application. In some embodiments, image acquisition unit 3020 may include one or more image capture devices (e.g., cameras, CCDs, or any other type of image sensor), such as image capture device 3022, an image capture device 3024, an image capture device 3026. System 3000 may also include a data interface 3028 communicatively connecting processing unit 3010 to image acquisition unit 3020. For example, data interface 3028 may include any wired and/or wireless link or links for transmitting image data acquired by image acquisition unit 3020 to processing unit 3010.

Wireless transceiver 3072 may include one or more devices configured to exchange transmissions over an air interface to one or more networks (e.g., cellular, the Internet, etc.) by use of a radio frequency, infrared frequency, magnetic field, or an electric field. Wireless transceiver 3072 may use any known standard to transmit and/or receive data (e.g., Wi-Fi, Bluetooth®, Bluetooth Smart, 802.15.4, Zig-Bee, etc.). Such transmissions may include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 3080 and image processor 3090 may include various types of hardware-based processing devices. For example, either or both of applications processor 3080 and image processor 3090 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, the central processing unit, or the like.

In some embodiments, applications processor 3080 and/or image processor 3090 may include multiple processing units with local memory and instruction sets. Such processors may include video inputs for receiving image data from multiple image sensors and may also include video out capabilities. In one example, the processor may use 90 nm-micron technology operating at 332 Mhz.

Any of the processing devices disclosed herein may be configured to perform certain functions. Configuring a processing device, such as any of the described processors, other controllers or microprocessors, to perform certain functions may include programming of computer-executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware-based components of a host vehicle.

While FIG. 3 depicts two separate processing devices included in the processing unit 3010, more or fewer processing devices may be used. For example, in some embodiments, a single processing device may be used to accomplish the tasks of applications processor 3080 and image processor 3090. In other embodiments, these tasks may be performed by more than two processing devices. Further, in some embodiments, vehicle control system 3000 may include one or more of processing unit 3010 without including other components, such as image acquisition unit 3020.

Processing unit 3010 may comprise various types of devices. For example, processing unit 3010 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock, and input-output circuits. The memory may store software that, when executed by the processor, controls the operation of the system. The memory may include databases and image processing software. The memory may comprise any number of random access memories, read-only memories, flash memories, disk drives, optical storage, tape storage, removable storage and other types of storage. In one instance, the memory may be separate from the processing unit 3010. In another instance, the memory may be integrated into the processing unit 3010.

Each memory 3040, 3050 may include software instructions that when executed by a processor (e.g., applications processor 3080 and/or image processor 3090), may control operation of various aspects of the vehicle control system 3000. These memory units may include various databases and image processing software, as well as a trained system, such as a neural network, or a deep neural network, for example. The memory units may include random access memory, read-only memory, flash memory, disk drives, optical storage, tape storage, removable storage and/or any other types of storage. In some embodiments, memory units 3040, 3050 may be separate from the applications processor 3080 and/or image processor 3090. In other embodiments, these memory units may be integrated into applications processor 3080 and/or image processor 3090.

Position sensor 3030 may include any type of device suitable for determining a location associated with at least one component of the vehicle control system 3000. In some embodiments, position sensor 3030 may include a GPS receiver. Such receivers can determine a user position and velocity by processing signals broadcasted by global positioning system satellites. Position information from position sensor 3030 may be made available to applications processor 3080 and/or image processor 3090.

In some embodiments, vehicle control system 3000 may include components such as a speed sensor (e.g., a speedometer) for measuring a speed of vehicle 1000. Vehicle control system 3000 may also include one or more accelerometers (either single axis or multi-axis) for measuring accelerations of vehicle 1000 along one or more axes.

The memory units 3040, 3050 may include a database, or data organized in any other form, that indication a location of known landmarks. Sensory information (such as images, radar signal, depth information from LIDAR or stereo processing of two or more images) of the environment may be processed together with position information, such as a GPS coordinate, vehicle's ego-motion, etc. to determine a current location of the vehicle relative to the known landmarks, and refine the vehicle location.

User interface 3070 may include any device suitable for providing information to or for receiving inputs from one or more users of the vehicle control system 3000. In some embodiments, user interface 3070 may include user input devices, including, for example, a touchscreen, microphone, keyboard, pointer devices, track wheels, cameras, knobs, buttons, or the like. With such input devices, a user may be able to provide information inputs or commands to vehicle control system 3000 by typing instructions or information, providing voice commands, selecting menu options on a screen using buttons, pointers, or eye-tracking capabilities, or through any other suitable techniques for communicating information to vehicle control system 3000.

User interface 3070 may be equipped with one or more processing devices configured to provide and receive information to or from a user and process that information for use by, for example, applications processor 3080. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 3070 may include a display, speaker, tactile device, and/or any other devices for providing output information to a user.

Map database 3060 may include any type of database for storing map data useful to the vehicle control system 3000. In some embodiments, map database 3060 may include data relating to the position, in a reference coordinate system, of various items, including roads, water features, geographic features, businesses, points of interest, restaurants, gas stations, etc. Map database 3060 may store not only the locations of such items but also descriptors relating to those items, including, for example, names associated with any of the stored features. In some embodiments, map database 3060 may be physically located with other components of the vehicle control system 3000. Alternatively or additionally, map database 3060 or a portion thereof may be located remotely with respect to other components of the vehicle control system 3000 (e.g., processing unit 3010). In such embodiments, information from map database 3060 may be downloaded over a wired or wireless data connection to a network (e.g., over a cellular network and/or the Internet, etc.). In some cases, map database 3060 may store a sparse data model including polynomial representations of certain road features (e.g., lane markings) or target trajectories for the host vehicle. Map database 3060 may also include stored representations of various recognized landmarks that may be used to determine or update a known position of the host vehicle with respect to a target trajectory. The landmark representations may include data fields such as landmark type, landmark location, among other potential identifiers.

Image capture devices 3022, 3024, and 3026 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 3022, 3024, and 3026 will be further described with reference to FIG. 4 below.

One or more cameras (e.g., image capture devices 3022, 3024, and 3026) may be part of a sensing block included on a vehicle. Various other sensors may be included in the sensing block, and any or all of the sensors may be relied upon to develop a sensed navigational state of the vehicle. In addition to cameras (forward, sideward, rearward, etc), other sensors such as RADAR, LIDAR, and acoustic sensors may be included in the sensing block. Additionally, the sensing block may include one or more components configured to communicate and transmit/receive information relating to the environment of the vehicle. For example, such components may include wireless transceivers (RF, etc.) that may receive from a source remotely located with respect to the host vehicle sensor-based information or any other type of information relating to the environment of the host vehicle. Such information may include sensor output information or related information received from vehicle systems other than the host vehicle. In some embodiments, such information may include information received from a remote computing device, a centralized server, etc. Furthermore, the cameras may take on many different configurations: single camera units, multiple cameras, camera clusters, long FOV, short FOV, wide angle, fisheye, or the like.

Figure 4:
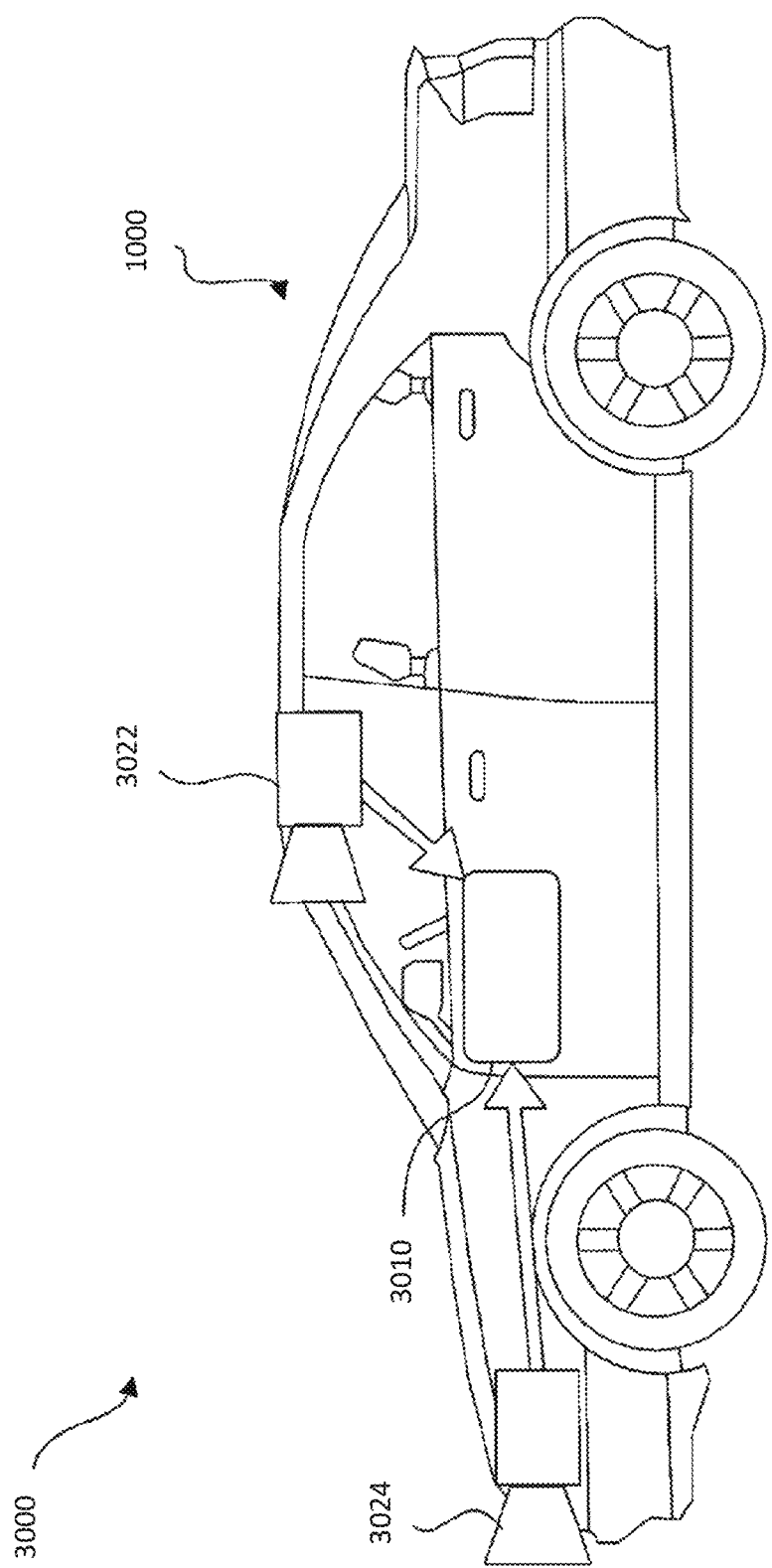
FIG. 4 is a diagram of an example of a side view of a vehicle including a vehicle control system in accordance with embodiments of this disclosure.

FIG. 4 is a diagram of an example of a side view of vehicle 1000 including a vehicle control system 3000 in accordance with embodiments of this disclosure. For example, vehicle 1000 may be equipped with a processing unit 3010 and any of the other components of the vehicle control system 3000, as described above relative to FIG. 3. While in some embodiments vehicle 1000 may be equipped with only a single image capture device (e.g., camera), in other embodiments, multiple image capture devices may be used. For example, either of image capture devices 3022 and 3024 of vehicle 1000, as shown in FIG. 4, may be part of an automated driving system imaging set.

The image capture devices included on vehicle 1000 as part of the image acquisition unit 3020 may be positioned at any suitable location. In some embodiments, image capture device 3022 may be located in the vicinity of the rearview mirror. This position may provide a line of sight similar to that of the driver of vehicle 1000, which may aid in determining what is and is not visible to the driver. Image capture device 3022 may be positioned at any location near the rearview mirror, but placing image capture device 3022 on the driver side of the mirror may further aid in obtaining images representative of the driver's field of view and/or line of sight.

Other locations for the image capture devices of image acquisition unit 3020 may also be used. For example, image capture device 3024 may be located on or in a bumper of vehicle 1000. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 3022, 3024, and 3026) may also be located in other locations. For example, the image capture devices may be located on or in one or both of the side mirrors of vehicle 1000, on the roof of vehicle 1000, on the hood of vehicle 1000, on the trunk of vehicle 1000, on the sides of vehicle 1000, mounted on, positioned behind, or positioned in front of any of the windows of vehicle 1000, and mounted in or near light fixtures on the front and/or back of vehicle 1000.

In addition to image capture devices, vehicle 1000 may include various other components of the vehicle control system 3000. For example, processing unit 3010 may be included on vehicle 1000 either integrated with or separate from an engine control unit (ECU) of the vehicle. Vehicle 1000 may also be equipped with a position sensor 3030, such as a GPS receiver and may also include a map database 3060 and memory units 3040 and 3050.

As discussed earlier, wireless transceiver 3072 may and/or receive data over one or more networks (e.g., cellular networks, the Internet, etc.). For example, wireless transceiver 3072 may upload data collected by the vehicle control system 3000 to one or more servers, and download data from the one or more servers. Via wireless transceiver 3072, vehicle control system 3000 may receive, for example, periodic or on-demand updates to data stored in map database 3060, memory 3040, and/or memory 3050. Similarly, wireless transceiver 3072 may upload any data (e.g., images captured by image acquisition unit 3020, data received by position sensor 3030 or other sensors, vehicle control systems, etc.) from vehicle control system 3000 and/or any data processed by processing unit 3010 to the one or more servers.

Vehicle control system 3000 may upload data to a server (e.g., to the cloud) based on a privacy level setting. For example, vehicle control system 3000 may implement privacy level settings to regulate or limit the types of data (including metadata) sent to the server that may uniquely identify a vehicle and or driver/owner of a vehicle. Such settings may be set by a user via, for example, wireless transceiver 3072, be initialized by factory default settings, or by data received by wireless transceiver 3072.

Figure 5:
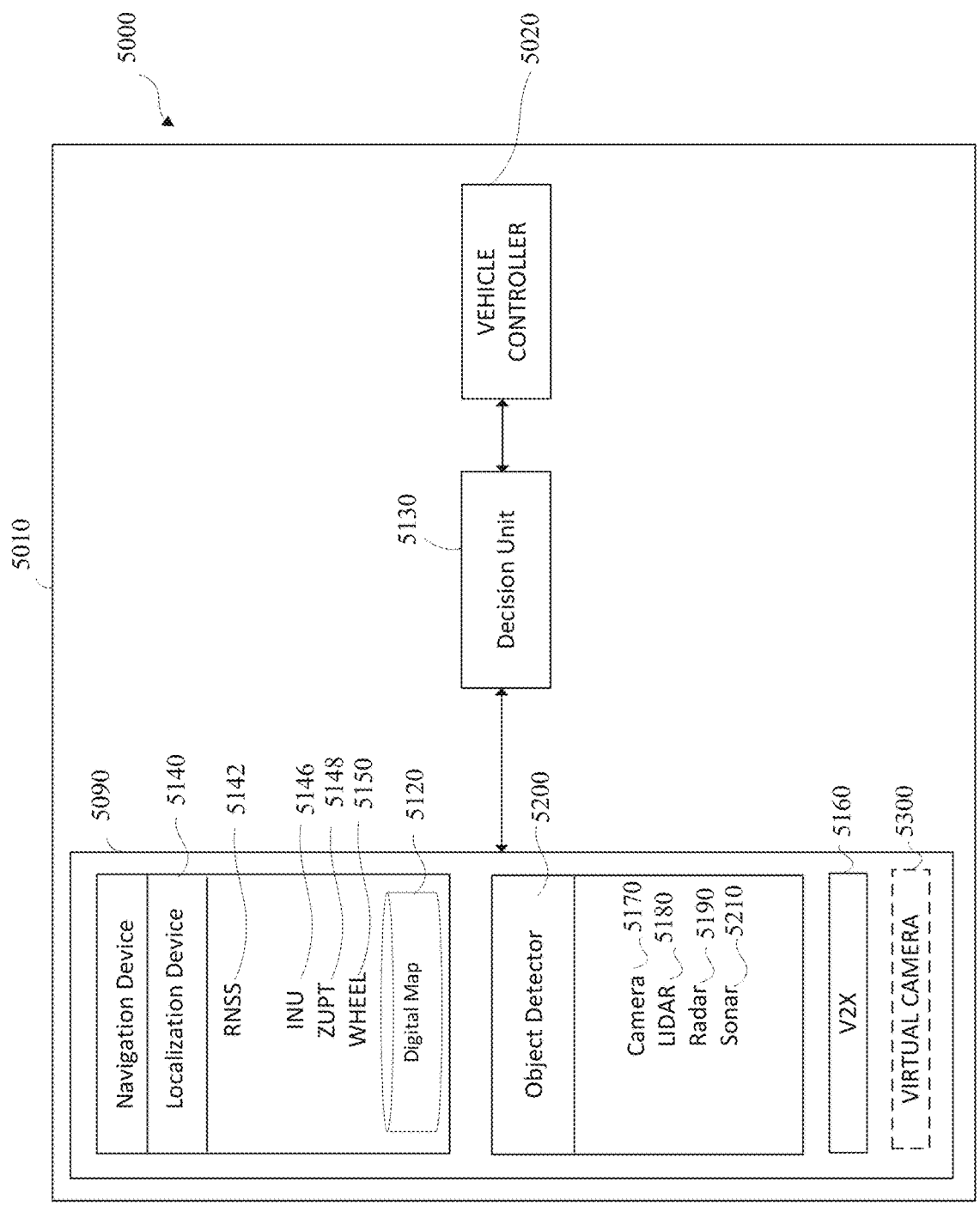
FIG. 5 is a diagram of an example of a vehicle control system in accordance with embodiments of this disclosure.

FIG. 5 is a diagram of an example of a vehicle system architecture 5000 in accordance with embodiments of this disclosure. The vehicle system architecture 5000 may be implemented as part of a host vehicle in 5010.

The vehicle system architecture 5000 includes a navigation device 5090, a decision unit 5130, object detector 5200, V2X communications 5160 and a vehicle controller 5020. The navigation device 5090 may be used by the decision unit 5130 to determine a travel path of the host vehicle 5010 to a destination. The travel path, for example, may include a travel route or a navigation path. The navigation device 5090, the decision unit 5130 and the vehicle controller 5020 may be collectively used to determine where to steer the host vehicle 5010 along a roadway such that the host vehicle 5010 is appropriately located on the roadway relative to, for example, lane markings, curbs, traffic signs, pedestrians, other vehicles, etc., determine a route based on a digital map 5120 that the host vehicle 5010 is instructed to follow to arrive at a destination, or both.

In order to determine where the host vehicle 5010 is located on the digital map 5120, the navigation device 5090 may include a localization device 5140, such as a GPS/GNSS receiver 5142, an inertial measurement unit (IMU) 5146, wheel 5148 and zero velocity update (ZUPT) 5150. A camera 5170, a radar unit 5190, a sonar unit 5210, a LIDAR unit 5180 or any combination thereof may be used to detect relatively permanent objects proximate to the host vehicle 5010 that are indicated on the digital map 5120, for example, traffic signals, buildings, etc., and determine a relative location relative to those objects in order to determine where the host vehicle 5010 is located on the digital map 5120. This process may be referred to as map localization. The functions of the navigation device 5090, the information provided by the navigation device 5090, or both, may be all or in part provided by way of V2I communications, V2V communications, vehicle-to-pedestrian (V2P) communications, or a combination thereof, which may generically be labeled as V2X communications 5160. The navigation device 5090, localization device 5140, or both may include a processor(s) such as a microprocessor or other control circuitry such as analog circuitry, digital circuitry, or both, including an application specific integrated circuit (ASIC) for processing data. The navigation device 5090, localization device 5140, or both may include a memory, including a non-volatile memory, such as electrically erasable programmable read-only memory (EEPROM) for storing one or more routines, thresholds, captured data, or a combination thereof.

The navigation device 5090 may implement a virtual camera 5300 to compensate for errors due to vehicle sensor calibration, localization, HD Map label and other vehicle systems and sensors errors, for example. The virtual camera 5300 may be associated with an actual or detected landmark or object which is then included in the vehicle sensor configurations when performing the coordinate transformation process as described herein.

In some implementations, an object detector 5200 may include the sonar unit 5210, the camera 5170, the LIDAR unit 5180, and the radar unit 5190. The object detector 5200 may be used to detect the relative location of another entity and determine an intersection point where another entity will intersect the travel path of the host vehicle 5010. In order to determine the intersection point and the relative timing of when the host vehicle 5010 and another entity will arrive at the intersection point, the object detector 5200 may be used by the vehicle system architecture 5000 to determine, for example, a relative speed, a separation distance of another entity from the host vehicle 5010, or both. The functions of the object detector 5200, the information provided by the object detector 5200, or both, may be all or in part by way of V2I communications, V2V communications, V2P communications, or a combination thereof, which may generically be labeled as V2X communications 5160. Accordingly, the vehicle system architecture 5000 may include a transceiver to enable such communications.

The vehicle system architecture 5000 includes a decision unit 5130 that is in communication with the object detector 5200, and the navigation device 5090. The communication may be by way of, but not limited to, wires, wireless communication, or optical fiber. The decision unit 5130 may include a processor(s) such as a microprocessor or other control circuitry such as analog circuitry, digital circuitry, or both, including an application specific integrated circuit (ASIC) for processing data. The decision unit 5130 may include a memory, including a non-volatile memory, such as electrically erasable programmable read-only memory (EEPROM) for storing one or more routines, thresholds, captured data, or a combination thereof. The decision unit 5130 may determine or control route or path planning, local driving behavior, and trajectory planning for the host vehicle 5010.

The vehicle system architecture 5000 includes a vehicle controller or trajectory tracker 5020 that is in communication with the decision unit 5130. The vehicle controller 5020 may execute a defined geometric path by applying appropriate vehicle commands such as steering, throttle, braking and the like motions to physical control mechanisms such as steering, accelerator, brakes, and the like that guide the vehicle along the geometric path. The vehicle controller 5020 may include a processor(s) such as a microprocessor or other control circuitry such as analog circuitry, digital circuitry, or both, including an application specific integrated circuit (ASIC) for processing data. The vehicle controller 5020 may include a memory, including a non-volatile memory, such as electrically erasable programmable read-only memory (EEPROM) for storing one or more routines, thresholds, captured data, or a combination thereof.

The host vehicle 5010 may operate in an automated mode where a human operator is not needed to operate the vehicle 5010. In the automated mode, the vehicle control system 5000 (using, for example, the vehicle controller 5020, the decision unit 5130, navigation device 5090, the object detector 5200 and the other described sensors and devices) autonomously controls the vehicle 5010. Alternatively, the host vehicle may operate in a manual mode where the degree or level of automation may be little more than providing steering advice to a human operator. For example, in manual mode, the vehicle system architecture 5000 may assist the human operator as needed to arrive at a selected destination, avoid interference or collision with another entity, or both, where another entity may be another vehicle, a pedestrian, a building, a tree, an animal, or any other object that the vehicle 5010 may encounter.

Figure 6:
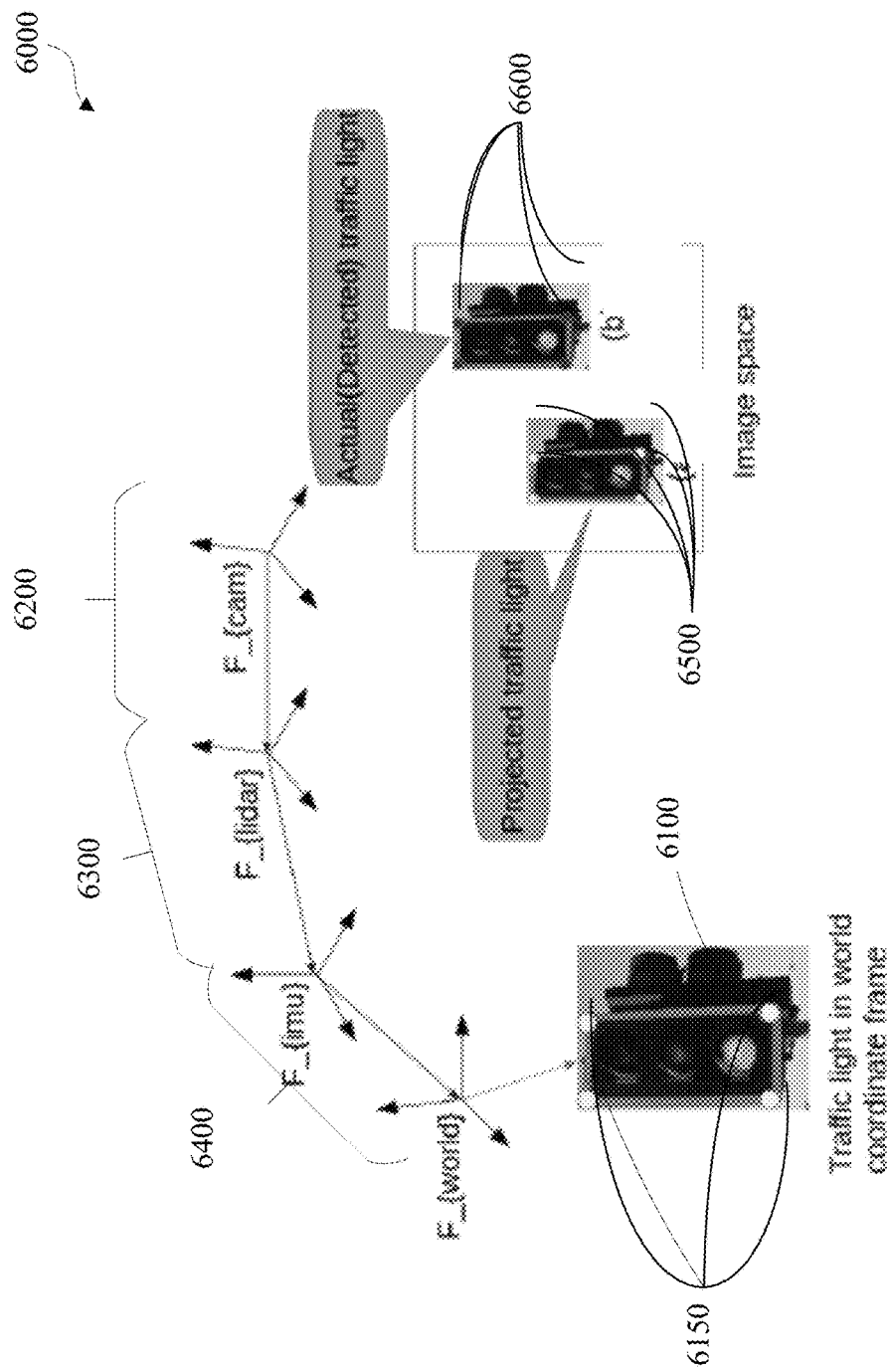
FIG. 6 is a diagram of an example of a general framework and system for projecting object coordinates without compensation.

FIG. 6 is a diagram of an example of a framework, process and system 6000 for projecting object coordinates without compensating for errors resulting from vehicle sensor calibration, localization, and the HD/MD-Map and the like. For the illustrative example, a traffic light 6100 is used as the landmark or object (collectively referred to as landmark) without limiting or affecting the scope of the specification and claims. Stop signs, information signs, telephone poles, communication towers, moving vehicles and the like may be used. The landmark or object may be static, stationary, dynamic, or moving.

A set of 3D points is obtained from a map, such as digital map 5120 in FIG. 5. For example, 4 3D points 6150 define the boundaries of the traffic light 6100. These 3D points are in a world coordinate system or world frame. The framework 6000 transforms the 3D points from the world coordinate system to a camera (such as camera 5170 in FIG. 5) frame or image coordinate system or image space using Equation (1):

$$\begin{bmatrix} p_{cam}^i \\ 1 \end{bmatrix} = H_{lidar}^{cam} H_{imu}^{lidar} H_{w}^{imu} \begin{bmatrix} p_{w}^i \\ 1 \end{bmatrix}, i \in \{1, \cdots, n\} \qquad \text{Equation (1)}$$

where $H_{lidar}^{cam} \in R^{4 \times 4}$, $H_{imu}^{lidar} \in R^{4 \times 4}$, and $H_{w}^{imu} \in R^{4 \times 4}$ are transformation matrices from a camera frame to a lidar frame 6200, from the lidar frame to a imu frame 6300, and from the imu frame to the world frame 6400, respectively. In addition, $p_w^i \in R^3$ and $p_{cam}^i \in R^3$ represent the $i^{th}$ 3D coordinates in world and camera frames, respectively. The normalized coordinates in the camera frame may then be expressed as:

$$\bar{p}_{cam}^i = \frac{1}{z_{cam}^i} p_{cam}^i, i \in \{1, \cdots, n\} \qquad \text{Equation (2)}$$

and projecting the normalized coordinates to the corresponding image pixel coordinates may be expressed as:

$$\begin{bmatrix} p_c^i \\ 1 \end{bmatrix} = K\bar{p}_{cam}^i, i \in \{1, \cdots, n\} \qquad \text{Equation (3)}$$

where $p_c^i \in R^2$ and $K \in R^{3 \times 3}$ are the camera intrinsic calibration matrix, which may be obtained by pre-calibration of the camera or found from manufacturer specifications. For instance, $p_c^i$, $i \in \{1, \ldots, 4\}$ (the projected coordinates in the image pixel coordinate system or image space) are projected points 6500. However, the actual or detected four corner positions $p_v^i$, $i \in \{1, \ldots, 4\}$ of the traffic light 6100 in 2D image space are detected points 6600. This offset between projected points 6500 and detected points 6600 result from the errors in sensor calibration, the digital map, localization and the like.

This offset can be minimized or overcome by establishing a virtual camera which is associated with the detected points 6600. For example, the navigation device 5090 may implement a virtual camera 5300. The virtual camera may share the same physical properties (i.e., intrinsic parameters) as the real camera, and may be used to define a transformation between the real camera and the virtual camera, namely $H_{cam}^{virtual} \in R^{4 \times 4}$. This transformation may also be referred to as a compensation transformation or an offset compensation transformation herein.

Figure 7:
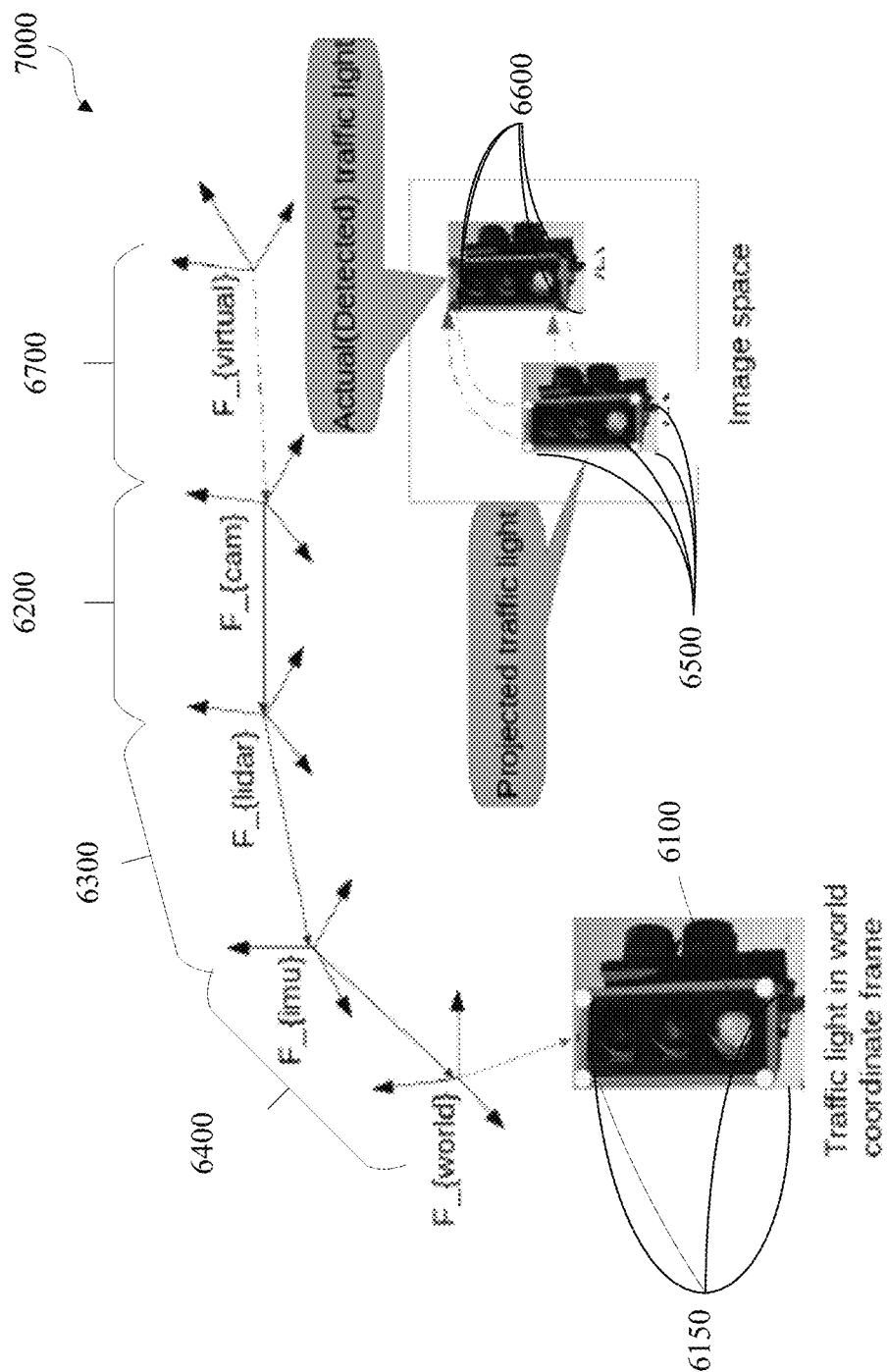
FIG. 7 is a diagram of an example of a general framework and system for projecting object coordinates with compensation in accordance with embodiments of this disclosure.

FIG. 7 is a diagram of an example of a general framework, process, and system 7000 for projecting object coordinates which includes offset compensation in accordance with embodiments of this disclosure, which may be implemented in part with the navigation device 5090, localization device 5140, map 5120 and the V2X 5160 of FIG. 5. FIG. 7 uses the numbering and associated description from FIG. 6 to simplify the description.

Inclusion of the virtual camera to the sensor configurations and framework of FIG. 6 projects the multiple 3D points such as the 4 3D points 6150 to the image pixel coordinate such that the 4 3D points 6500 overlap with the detected points 6600. The framework 7000 transforms the 3D points from the world coordinate system to the virtual camera frame or virtual camera coordinate frame using Equation (4):

$$\begin{bmatrix} p_{virtual}^i \\ 1 \end{bmatrix} = H_{cam}^{virtual} H_{lidar}^{cam} H_{imu}^{lidar} H_w^{imu} \begin{bmatrix} p_w^i \\ 1 \end{bmatrix}, i \in \{1, \cdots, n\} \qquad \text{Equation (4)}$$

where $H_{cam}^{virtual}$ is the offset compensation transformation matrix between the real camera and the virtual camera 6700. The normalized 3D coordinates in virtual camera frame may then be expressed as:

$$\bar{p}_{virtual}^i = \frac{1}{z_{virtual}^i} p_{virtual}^i, i \in \{1, \cdots, n\} \qquad \text{Equation (5)}$$

and projecting the normalized coordinates to the corresponding image pixel coordinate may be expressed as:

$$\begin{bmatrix} p_v^i \\ 1 \end{bmatrix} = K\bar{p}_{virtual}^i, i \in \{1, \cdots, n\} \qquad \text{Equation (6)}$$

Figure 8:
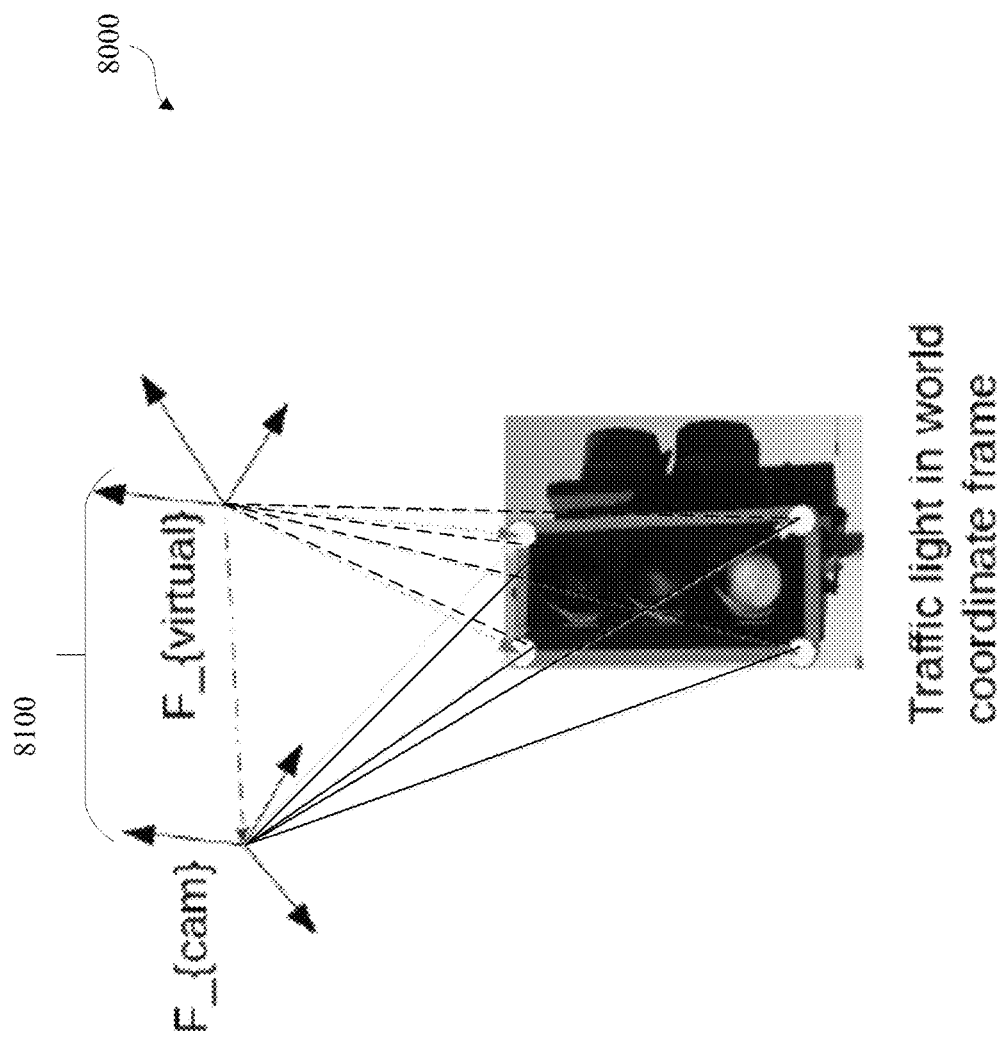
FIG. 8 is a diagram of an example of a general framework and system for projecting object coordinates with compensation in accordance with embodiments of this disclosure.

Simplifying, the goal is to now determine the offset compensation transformation matrix $H_{cam}^{virtual} \in R^{4 \times 4}$ with the corresponding feature points, which may be observed by both the virtual camera and the real camera as shown in FIG. 8. This is the offset compensation transformation matrix between the real camera and the virtual camera 8100. Solving for the offset compensation transformation matrix may be treated as a 3D-2D point corresponding problem since the four 3D points on the boundaries of the traffic light in camera coordinate frame are known (e.g. points 6150 in FIG. 6 or 7) and the actual or detected four 2D points can be obtained in image space by using corner detection or object detection algorithms (e.g. points 6600 in FIG. 6 or 7). The 3D-2D point corresponding problem may then be solved by applying camera pose estimation algorithms or techniques such as the Perspective-n-Point (PnP) technique or the like. The offset compensation transformation may then be applied to data prior to use by the vehicle systems.

In an implementation, determination of the offset compensation transformation may be done once if, for example, the errors were due to vehicle sensor calibration. In an implementation, determination of the offset compensation transformation may be done on a periodic basis. In an implementation, determination of the offset compensation transformation matrix may be done when a defined threshold related to the difference between the projected and detected points is met or exceeded. In an implementation, robustness of the offset compensation transformation may be increased by collecting multiple 3D points in multiple consecutive locations or time frames and the corresponding 2D points and then running a Random Sample consensus (RANSAC) to remove outliers and mismatches. For example, multiple pairs of the points may average out the noise compared to just using a single pair of points. As before, the camera position estimation algorithm may then be applied to obtain the offset compensation transformation matrix.

Figure 9:
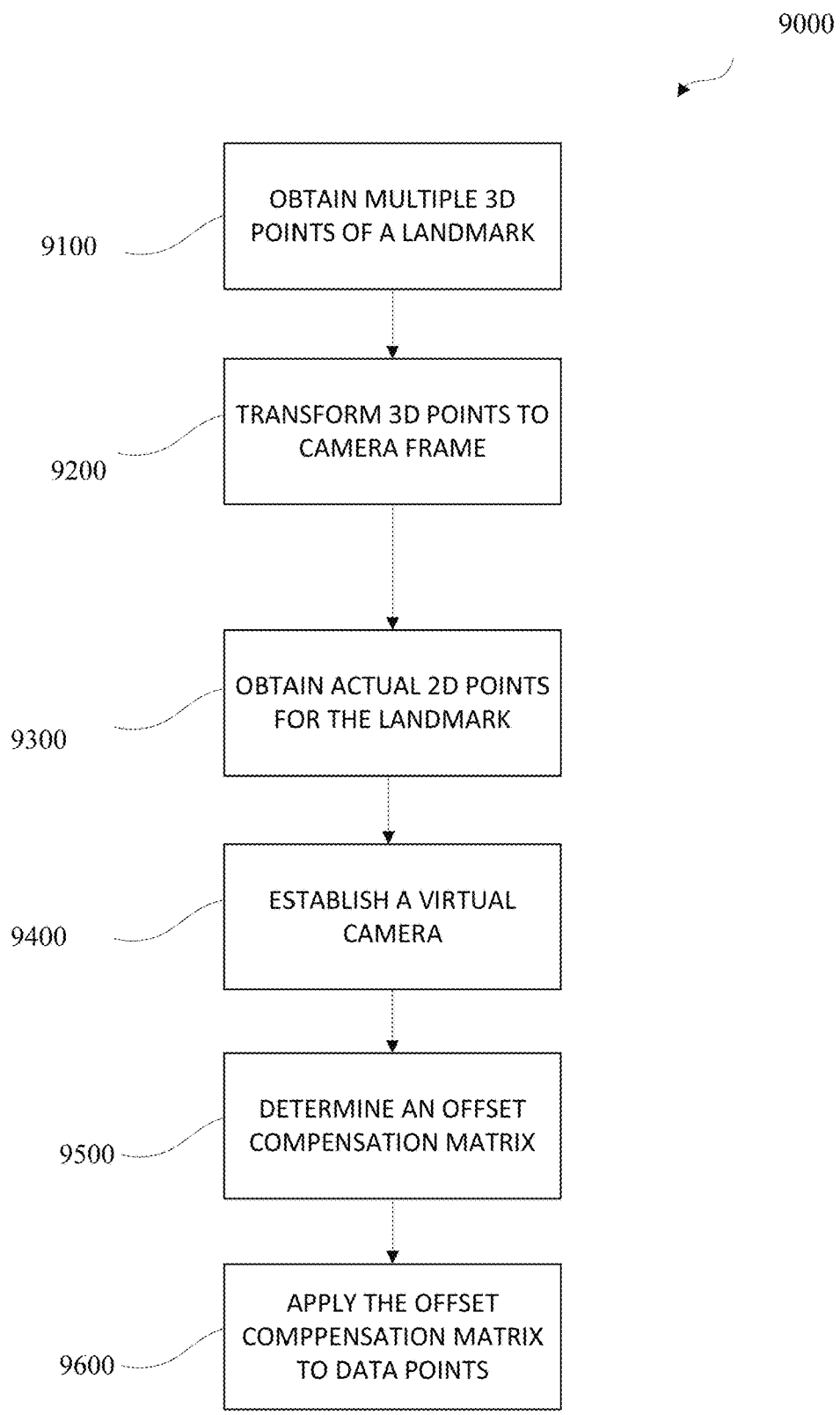
FIG. 9 is a flowchart of an example method for vehicle calibration compensation in accordance with embodiments of this disclosure.

FIG. 9 is a diagram of an example of a technique or method 9000 for offset compensation for errors in vehicle systems in accordance with embodiments of this disclosure. The method 9000 includes: obtaining 9100 multiple 3D points for a landmark from vehicle systems; transforming 9200 the multiple 3D points into a camera frame; obtaining 9300 actual multiple 2D points for the landmark; establishing 9400 a virtual camera corresponding to the actual multiple 2D points for the landmark; determining 9500 an offset compensation matrix by applying a camera pose algorithm using the multiple 3D points in the camera frame and the actual multiple 2D points in the virtual camera frame; and applying 9600 the offset compensation matrix to data points prior to use by vehicle control systems. For example, the technique 9000 may be implemented, as applicable and appropriate, by the localization device 5140 shown in FIG. 5, the navigation device 5090 shown in FIG. 5, the V2X 5160, the map 5120, the control system 1010 shown in FIG. 1, the processor 1020 shown in FIG. 1 or FIG. 2 or the processing unit 3010 shown in FIG. 3 or FIG. 4.

The method 9000 includes obtaining 9100 multiple 3D points for a landmark from vehicle systems. In an implementation, the multiple 3D points are in a world coordinate system or a world frame. In an implementation, the multiple 3D points may be obtained from a digital map. In an implementation, the multiple 3D points may be obtained from vehicle sensor systems. In an implementation, the multiple 3D points may be obtained after localization.

The method 9000 includes transforming 9200 the multiple 3D points into a camera frame. In an implementation, the multiple 3D points undergo a multiple step transformation. In an implementation, the multiple 3D points undergo transformations from the world frame to an IMU frame, from the IMU frame to a LiDAR frame, and from the LiDAR frame to a real camera 2D frame.

The method 9000 includes obtaining 9300 actual multiple 2D points for the landmark. In an implementation, image detection techniques may be used to determine the actual multiple 2D points. In an implementation, object detection techniques may be used to determine the actual multiple 2D points. In an implementation, corner detection techniques may be used to determine the actual multiple 2D points.

The method 9000 includes establishing 9400 a virtual camera corresponding to the actual multiple 2D points for the landmark. In an implementation, the virtual camera may share the same physical properties as the real camera. In an implementation, the virtual camera may share the same intrinsic parameters as the real camera. In an implementation, the virtual camera may be used to define a transformation space between the real camera and the virtual camera.

The method 9000 includes determining 9500 an offset compensation matrix by applying a camera pose algorithm using the multiple 3D points in the camera frame and the actual multiple 2D points in the virtual camera frame. The offset compensation matrix is the transform between the real camera and the virtual camera. In an implementation, the camera pose algorithm may be a Perspective-n-Point (PnP) technique or algorithm. In an implementation, the offset compensation matrix may include translational matrices and rotation matrices. In an implementation, the offset compensation matrix may include yaw, pitch and roll matrices. In an implementation, the offset compensation matrix may include x, y and z matrices.

The method 9000 includes applying 9600 the offset compensation matrix to data points prior to use by vehicle control systems. The offset compensation matrix may be applied to data points from vehicle sensor systems, localization, digital maps and the like before being used by a decision unit, a controller, vehicle controller or other like systems for guiding, controlling and the like of the vehicle.

Figure 10:
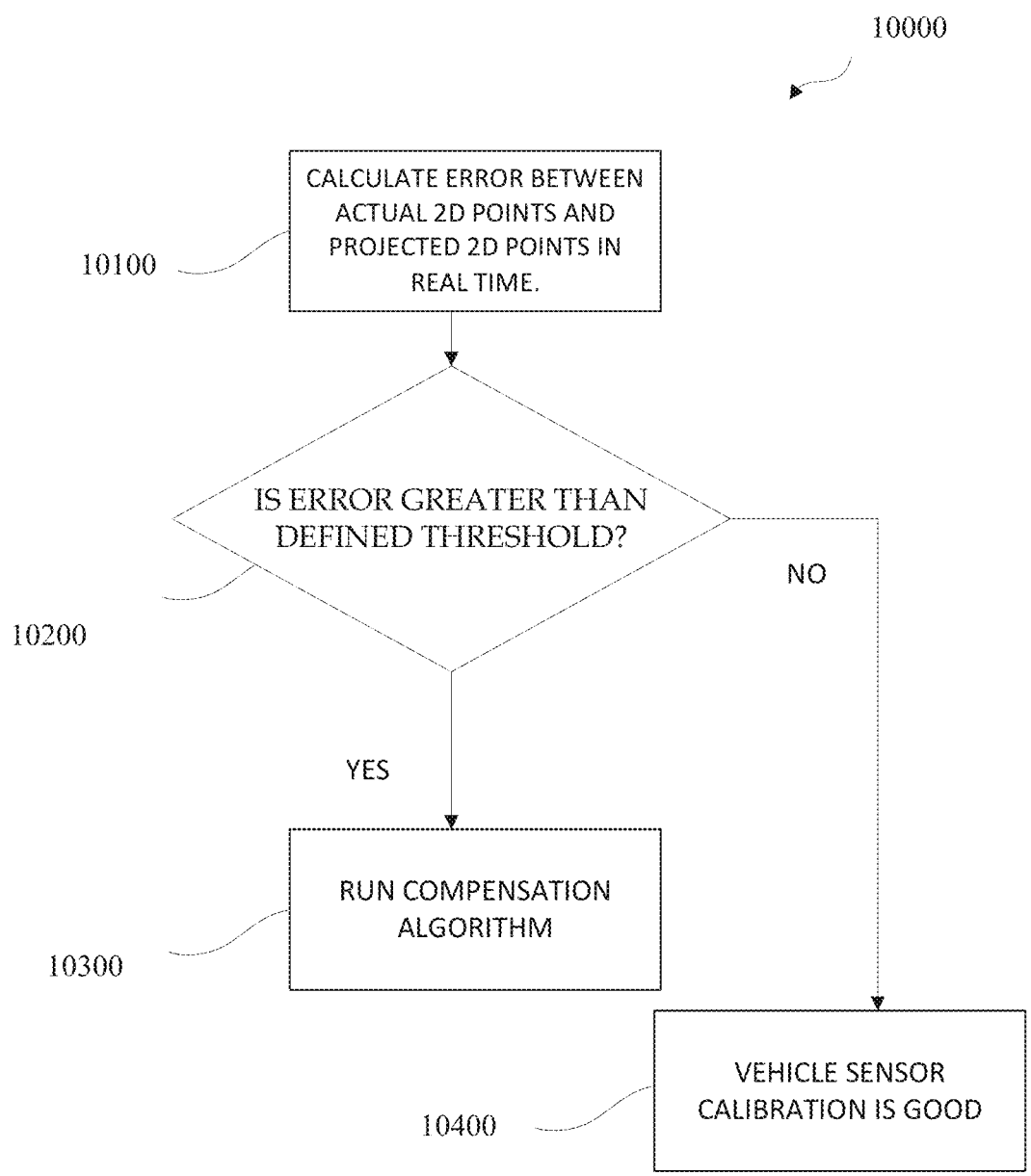
FIG. 10 is a flowchart of an example method for vehicle calibration compensation in accordance with embodiments of this disclosure.

FIG. 10 is a flowchart of an example method or technique 10000 for vehicle calibration compensation in accordance with embodiments of this disclosure. The method 10000 includes: calculating 10100 errors between actual 2D points and projected 2D points in real time; determining 10200 if an error is greater than a defined threshold; running 10300 compensation algorithm when error is equal to or greater than the defined threshold; and maintaining 10400 current vehicle sensor calibration when error is less than the defined threshold. For example, the technique 10000 may be implemented, as applicable and appropriate, by the localization device 5140 shown in FIG. 5, the navigation device 5090 shown in FIG. 5, the V2X 5160, the map 5120, the control system 1010 shown in FIG. 1, the processor 1020 shown in FIG. 1 or FIG. 2 or the processing unit 3010 shown in FIG. 3 or FIG. 4.

The method 10000 includes calculating 10100 errors between actual 2D points and projected 2D points in real time. In an implementation, the error may be a root-mean square error between the two sets of points. In an implementation, the error may be an absolute error between the two sets of points.

The method 10000 includes determining 10200 if an error is greater than a defined threshold.

The method 10000 includes running 10300 compensation algorithm when error is equal to or greater than the defined threshold. In an implementation, the method 9000 may be executed to determine an offset compensation matrix.

The method 10000 includes maintaining 10400 current vehicle sensor calibration when error is less than the defined threshold. In an implementation, the current vehicle sensor calibration is good and a status quo may be maintained.

Figure 11:
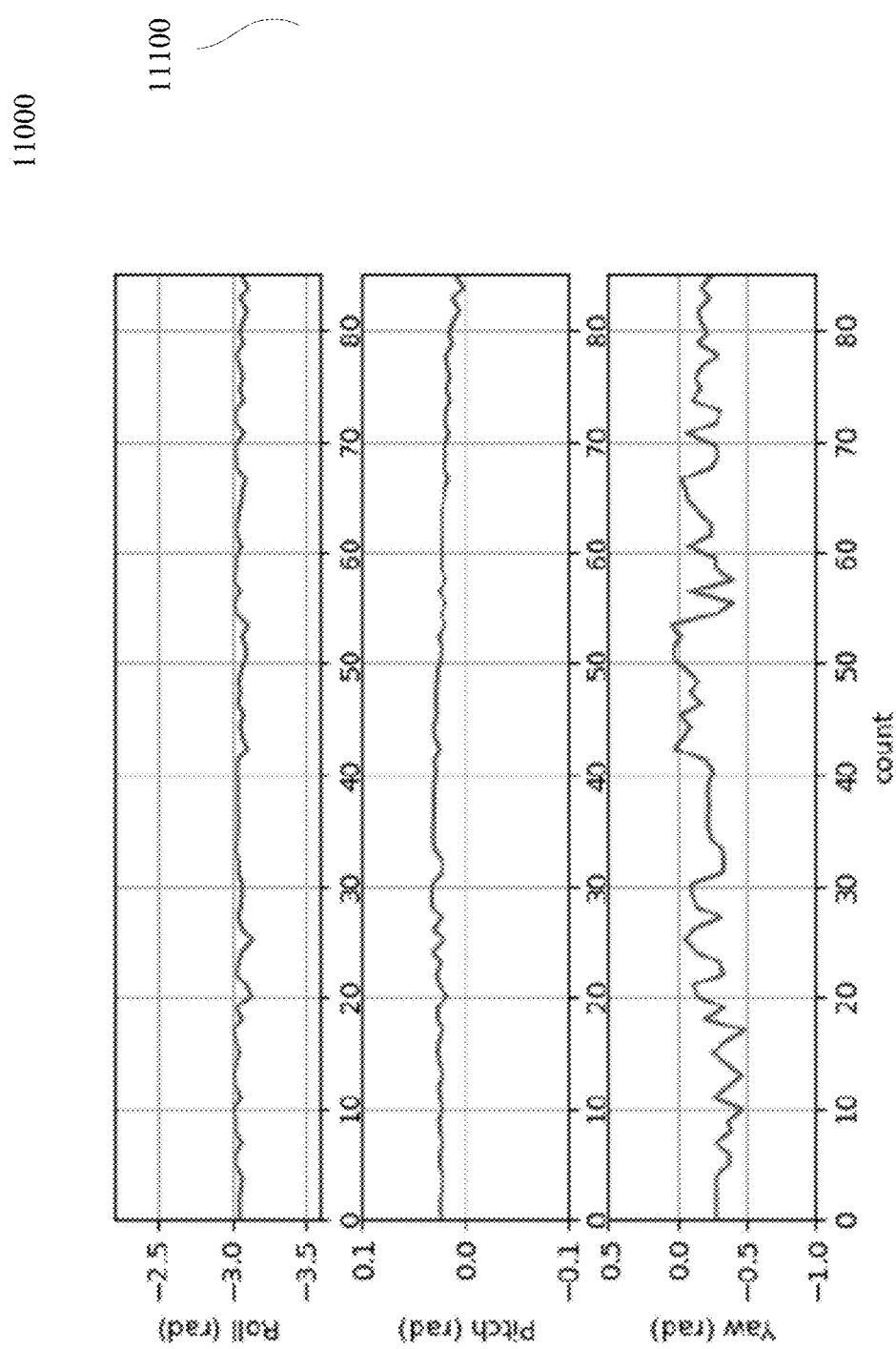
FIG. 11 is a graph of example of rotation matrices in accordance with embodiments of this disclosure.
Figure 12:
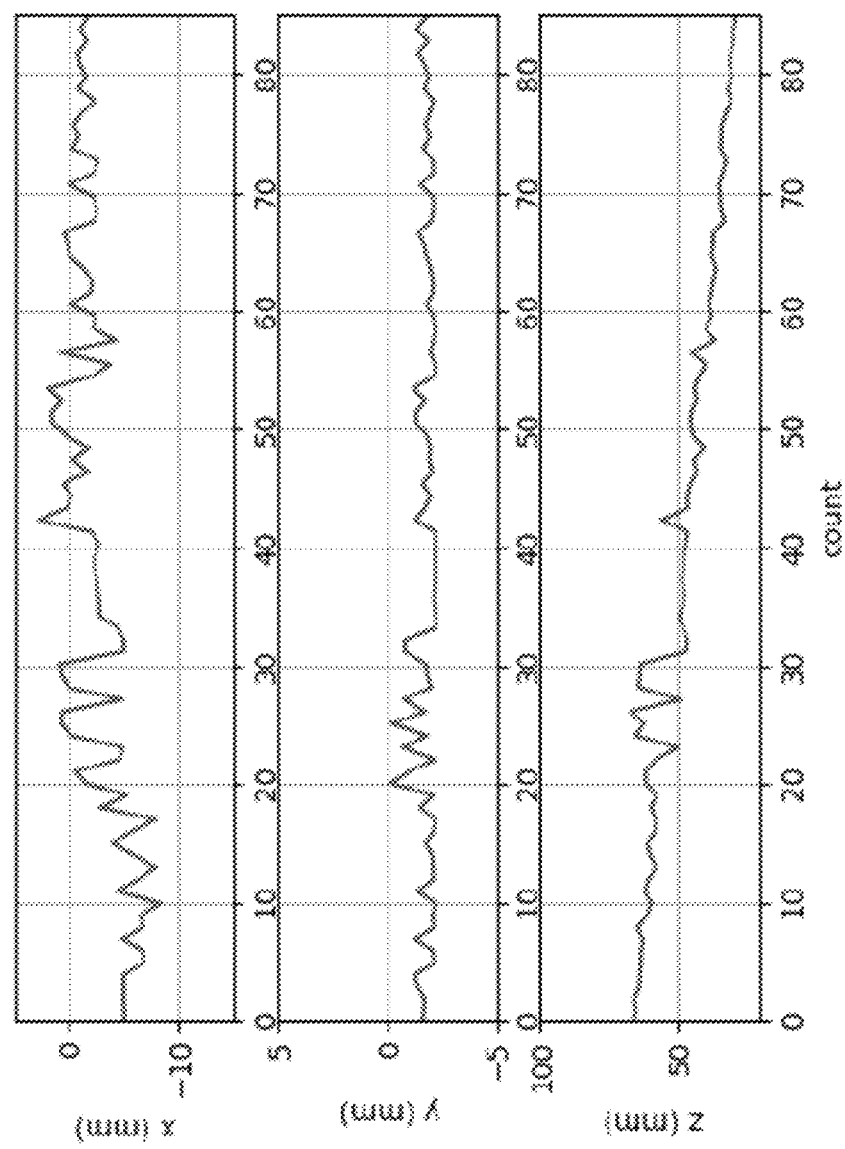
FIG. 12 is a graph of example of translation matrices in accordance with embodiments of this disclosure.
Figure 13:
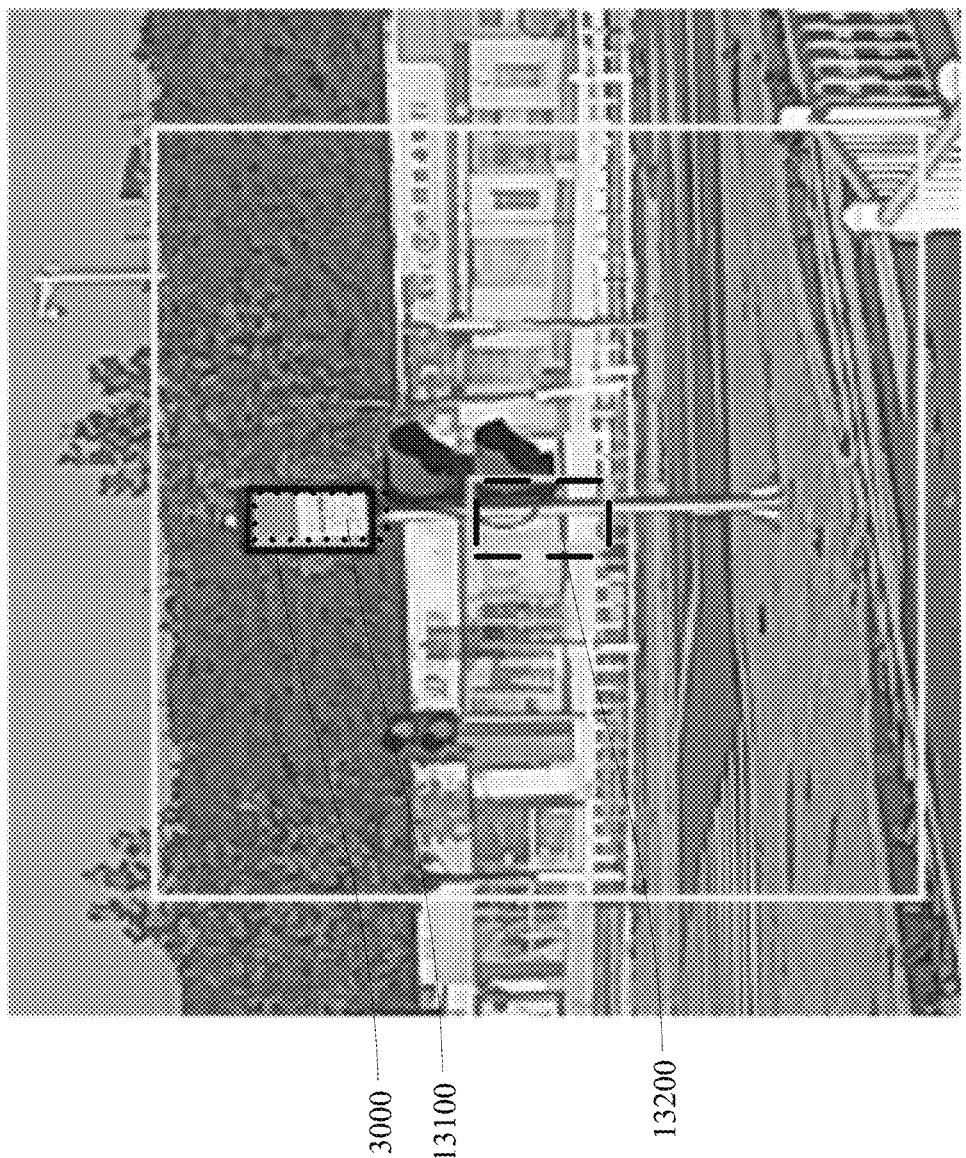
FIG. 13 is a photograph of an example landmark match using the vehicle calibration compensation methods in accordance with embodiments of this disclosure.

Experiments were conducted to evaluate the performance of the described technique. The 3D points on the boundaries of the traffic light in the camera frame was collected and the corresponding actual 2D traffic light coordinates were collected simultaneously using, for example, Build Apollo. For purposes of the experiment, the 3D points in the world frame were transformed through the imu, lidar, and camera frames using inaccurate sensor calibration matrices. Given both 3D points in the camera frame and the corresponding 2D coordinates in the virtual camera image space, the offset compensation transformation matrices $H_{cam}^{virtual} \in R^{4 \times 4}$ (e.g., rotation and translation matrices) may be obtained by applying the PnP algorithm. The estimated offset compensation transformation matrix between the real and virtual cameras are shown in FIGS. 11 and 12. FIG. 11 are graphs of an example of rotation matrices in accordance with embodiments of this disclosure and FIG. 12 are graphs of translation matrices in accordance with embodiments of this disclosure. The 3D points in world frame may then be projected to the virtual camera frame with the offset compensation transformation matrix using Equations 4-6 in sequential order. As shown in FIG. 13, which is a photograph of an example landmark match using the vehicle calibration compensation methods in accordance with embodiments of this disclosure, the projected bounding box 13000 and the actual bounding box 13100 overlap. The degree of overlap may vary. A non-compensated bounding box 13200 is shown for purposes of comparison.

In general, a method for compensating for autonomous vehicle (AV) system errors includes obtaining multiple 3D points for an object. The multiple 3D points are transformed to a camera frame. Actual 2D points are obtained for the object and a virtual camera corresponding to the actual 2D points is established. An offset compensation matrix is determined between a camera associated with the camera frame and the virtual camera. The offset compensation matrix is applied to data points prior to use by vehicle control systems and the operation of the AV is controlled with the offset compensated data points. In an implementation, a camera pose algorithm is executed using the multiple 3D points in the camera frame and the actual multiple 2D points in a virtual camera frame associated with the virtual camera to determine the offset compensation matrix. In an implementation, the offset compensation matrix includes translational matrices and rotation matrices. In an implementation, the multiple 3D points are in a world coordinate frame. In an implementation, the multiple 3D points in the world coordinate frame are transformed to an inertial measurement unit (IMU) frame, from the IMU frame to a Light Detection and Ranging (LiDAR) frame, and from the LiDAR frame to the camera frame. In an implementation, the actual 2D points are determined using at least one of image detection, object detection, and corner detection. In an implementation, the physical properties of the virtual camera and the camera are the same. In an implementation, the intrinsic parameters of the virtual camera and the camera are the same. In an implementation, the offset compensation matrix includes yaw, pitch and roll matrices.

In general, a vehicle system includes a processor configured to obtain multiple 3D points for an object, transform the multiple 3D points to a camera frame, obtain actual 2D points for the object, establish a virtual camera corresponding to the actual 2D points, determine an offset compensation matrix between a camera associated with the camera frame and the virtual camera, and apply the offset compensation matrix to data points prior to use by vehicle control systems, and a controller configured to control operation of the AV with offset compensated data points. In an implementation, the processor is further configured to execute a camera pose algorithm using the multiple 3D points in the camera frame and the actual multiple 2D points in a virtual camera frame associated with the virtual camera to determine the offset compensation matrix. In an implementation, the offset compensation matrix includes translational matrices and rotation matrices. In an implementation, the multiple 3D points are in a world coordinate frame. In an implementation, the multiple 3D points in the world coordinate frame are transformed to an inertial measurement unit (IMU) frame, from the IMU frame to a Light Detection and Ranging (LiDAR) frame, and from the LiDAR frame to the camera frame. In an implementation, the actual 2D points are determined using at least one of image detection, object detection, and corner detection. In an implementation, the physical properties and intrinsic parameters of the virtual camera and the camera are the same. In an implementation, the offset compensation matrix includes yaw, pitch and roll matrices.

In general, a method for compensating for autonomous vehicle (AV) system errors includes obtaining projected 2D points from multiple 3D points for an object and obtaining actual 2D points for the object. An error is calculated between the projected 2D points and the actual 2D points. A compensation algorithm is executed when a calculated error is equal to or greater than a defined threshold. The compensation algorithm includes transforming the multiple 3D points to a camera frame, establishing a virtual camera corresponding to the actual 2D points, determining an offset compensation matrix between a camera associated with the camera frame and the virtual camera, and applying the offset compensation matrix to data points prior to use by vehicle control systems, and controlling operation of the AV with offset compensated data points. In an implementation, the determining the offset compensation matrix further includes executing a camera pose algorithm using the multiple 3D points in the camera frame and the actual multiple 2D points in a virtual camera frame associated with the virtual camera to determine the offset compensation matrix. In an implementation, the offset compensation matrix includes translational matrices and rotation matrices.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for compensating for autonomous vehicle (AV) system errors, the method comprising:
    obtaining multiple 3D points for an object;
    transforming the multiple 3D points to a camera frame;
    obtaining actual 2D points for the object;
    establishing a virtual camera corresponding to the actual 2D points;
    determining an offset compensation matrix between a camera associated with the camera frame and the virtual camera;
    applying the offset compensation matrix to data points prior to use by vehicle control systems; and
    controlling operation of the AV with offset compensated data points.

2. The method of claim 1, wherein the determining the offset compensation matrix further comprising:
    executing a camera pose algorithm using the multiple 3D points in the camera frame and the actual multiple 2D points in a virtual camera frame associated with the virtual camera to determine the offset compensation matrix.

3. The method of claim 1, wherein the offset compensation matrix includes translational matrices and rotation matrices.

4. The method of claim 1, wherein the multiple 3D points are in a world coordinate frame.

5. The method of claim 4, wherein the multiple 3D points in the world coordinate frame are transformed to an inertial measurement unit (IMU) frame, from the IMU frame to a Light Detection and Ranging (LiDAR) frame, and from the LiDAR frame to the camera frame.

6. The method of claim 1, wherein the actual 2D points are determined using at least one of image detection, object detection, and corner detection.

7. The method of claim 1, wherein physical properties of the virtual camera and the camera are the same.

8. The method of claim 7, wherein intrinsic parameters of the virtual camera and the camera are the same.

9. The method of claim 1, wherein the offset compensation matrix includes yaw, pitch and roll matrices.

10. A vehicle system comprising:
    a processor configured to:
        obtain multiple 3D points for an object;
        transform the multiple 3D points to a camera frame;
        obtain actual 2D points for the object;
        establish a virtual camera corresponding to the actual 2D points;
        determine an offset compensation matrix between a camera associated with the camera frame and the virtual camera; and
        apply the offset compensation matrix to data points prior to use by vehicle control systems; and
    a controller configured to control operation of the AV with offset compensated data points.

11. The vehicle system of claim 10, wherein the processor further configured to:
    execute a camera pose algorithm using the multiple 3D points in the camera frame and the actual multiple 2D points in a virtual camera frame associated with the virtual camera to determine the offset compensation matrix.

12. The vehicle system of claim 10, wherein the offset compensation matrix includes translational matrices and rotation matrices.

13. The vehicle system of claim 10, wherein the multiple 3D points are in a world coordinate frame.

14. The vehicle system of claim 13, wherein the multiple 3D points in the world coordinate frame are transformed to an inertial measurement unit (IMU) frame, from the IMU frame to a Light Detection and Ranging (LiDAR) frame, and from the LiDAR frame to the camera frame.

15. The vehicle system of claim 10, wherein the actual 2D points are determined using at least one of image detection, object detection, and corner detection.

16. The vehicle system of claim 10, wherein physical properties and intrinsic parameters of the virtual camera and the camera are the same.

17. The vehicle system of claim 10, wherein the offset compensation matrix includes yaw, pitch and roll matrices.

18. A method for compensating for autonomous vehicle (AV) system errors, the method comprising:
    obtaining projected 2D points from multiple 3D points for an object;
    obtaining actual 2D points for the object;

calculating an error between the projected 2D points and the actual 2D points;

executing a compensation algorithm when a calculated error is equal to or greater than a defined threshold, wherein the compensation algorithm comprises:
transforming the multiple 3D points to a camera frame;
establishing a virtual camera corresponding to the actual 2D points;
determining an offset compensation matrix between a camera associated with the camera frame and the virtual camera; and
applying the offset compensation matrix to data points prior to use by vehicle control systems; and controlling operation of the AV with offset compensated data points.

19. The method of claim 18, wherein the determining the offset compensation matrix further comprising:
executing a camera pose algorithm using the multiple 3D points in the camera frame and the actual multiple 2D points in a virtual camera frame associated with the virtual camera to determine the offset compensation matrix.

20. The method of claim 19, wherein the offset compensation matrix includes translational matrices and rotation matrices.

* * * * *